United States Patent
Zielinsky

(10) Patent No.: US 8,070,208 B2
(45) Date of Patent: Dec. 6, 2011

(54) MULTI-POSITION TAILGATE ADJUSTMENT APPARATUS AND METHOD

(76) Inventor: Cary Russell Zielinsky, Liberty, UT (US)

(*) Notice: Subject to any disclaimer, the term of this patent is extended or adjusted under 35 U.S.C. 154(b) by 109 days.

(21) Appl. No.: 12/684,038

(22) Filed: Jan. 7, 2010

(65) Prior Publication Data

US 2011/0163565 A1 Jul. 7, 2011

(51) Int. Cl.
*E05C 17/30* (2006.01)
*E05C 17/36* (2006.01)
*B60J 5/10* (2006.01)

(52) U.S. Cl. .......................... 296/57.1; 296/106; 16/82

(58) Field of Classification Search .................. 296/50, 296/57.1, 146.8, 180.5, 106; 16/82; 24/298, 24/302

See application file for complete search history.

(56) References Cited

U.S. PATENT DOCUMENTS

| | | | | |
|---|---|---|---|---|
| 269,009 A * | 12/1882 | Chapman | ...................... | 296/57.1 |
| 390,253 A * | 10/1888 | Reichart | ......................... | 296/61 |
| 437,415 A * | 9/1890 | Bartlett | ........................ | 296/57.1 |
| 622,049 A * | 3/1899 | Kissinger | ..................... | 296/57.1 |
| 657,946 A * | 9/1900 | Lillpop | ......................... | 296/57.1 |
| 770,572 A * | 9/1904 | Gnatzig | ........................ | 296/57.1 |
| 1,220,183 A * | 3/1917 | Cappel | ......................... | 296/182.1 |
| 3,145,988 A * | 8/1964 | Colautti et al. | ................. | 49/280 |
| 4,580,828 A * | 4/1986 | Jones | ........................... | 296/57.1 |
| 6,267,429 B1 * | 7/2001 | Kuzmich et al. | ................ | 296/50 |
| 6,450,559 B1 * | 9/2002 | Renke | ........................... | 296/57.1 |
| 7,658,427 B2 * | 2/2010 | Patton, Jr. | ...................... | 296/50 |

* cited by examiner

*Primary Examiner* — Glenn Dayoan
*Assistant Examiner* — Gregory Blankenship
(74) *Attorney, Agent, or Firm* — Warren M. Pate, LLC

(57) ABSTRACT

A method and apparatus for adjusting the location of suspension for a tailgate is disclosed. The method may include selecting a vehicle comprising a first side, a second side, a tailgate, a tailgate support, and an adjustor. The tailgate may be connected to pivot with respect to the first and second sides through a range of motion. The adjustor may include a base and a traveler configured to move with respect to the base. The base may be positioned on, and fixed with respect to, one of the tailgate and a first side of the vehicle. When the base is positioned on the tailgate, the tailgate support may extend to connect the traveler to the first side of the vehicle. Alternatively, when the base is position on the first side of the vehicle, the tailgate support may extend to connect the traveler to the tailgate. In either configuration, by manipulating the position of the traveler with respect to the base, the location of suspension for the tailgate may be adjusted.

20 Claims, 27 Drawing Sheets

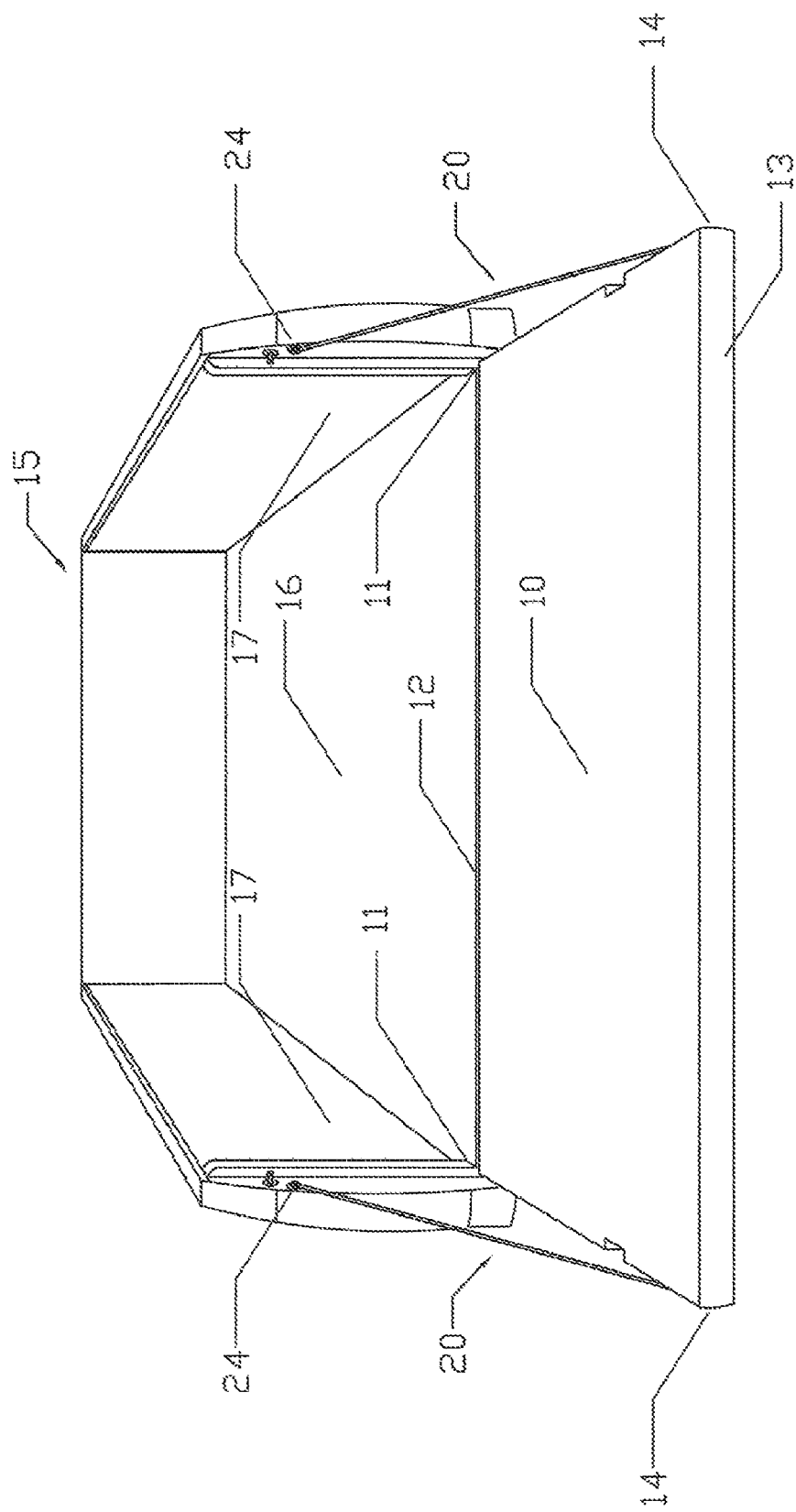

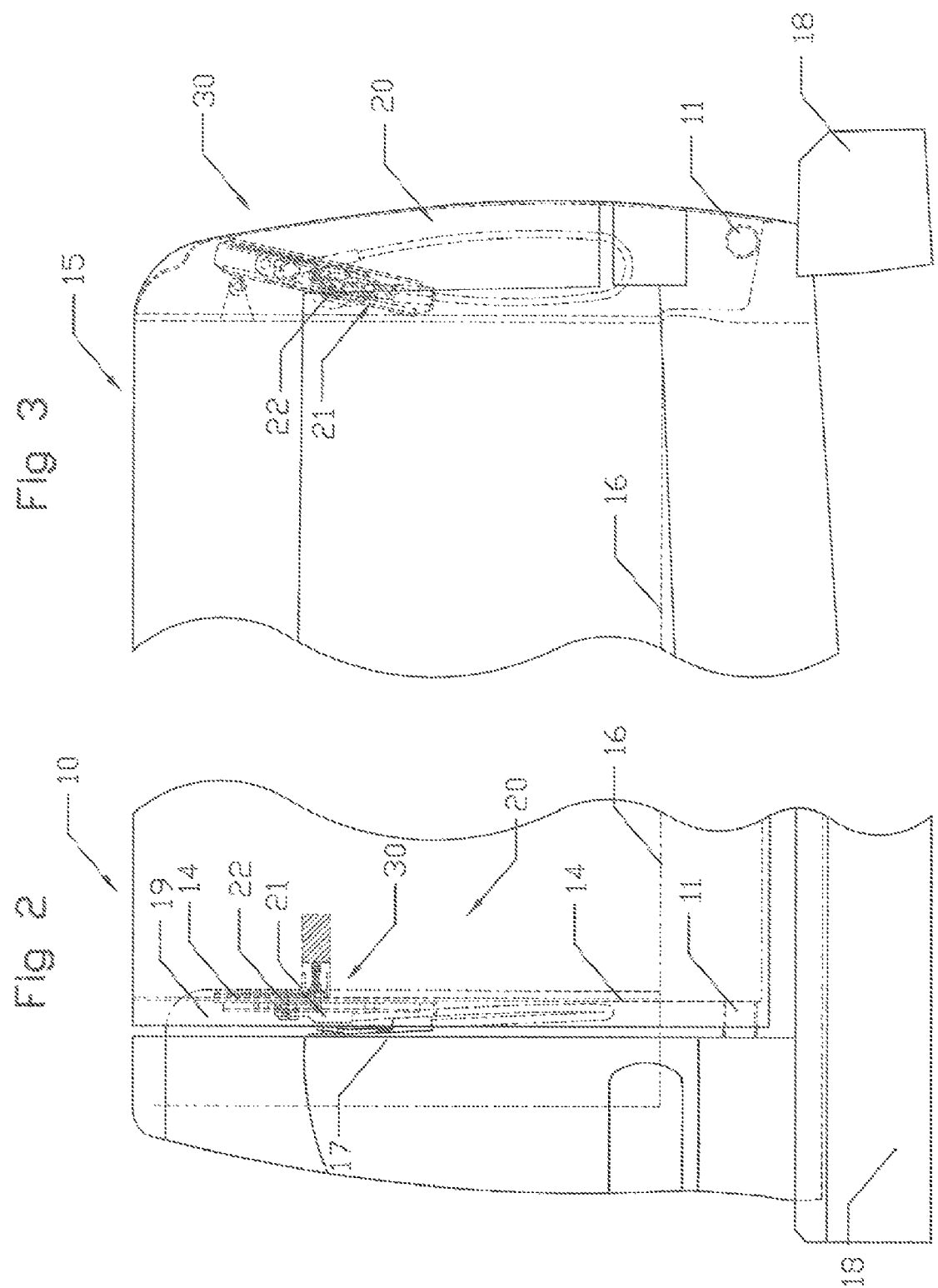

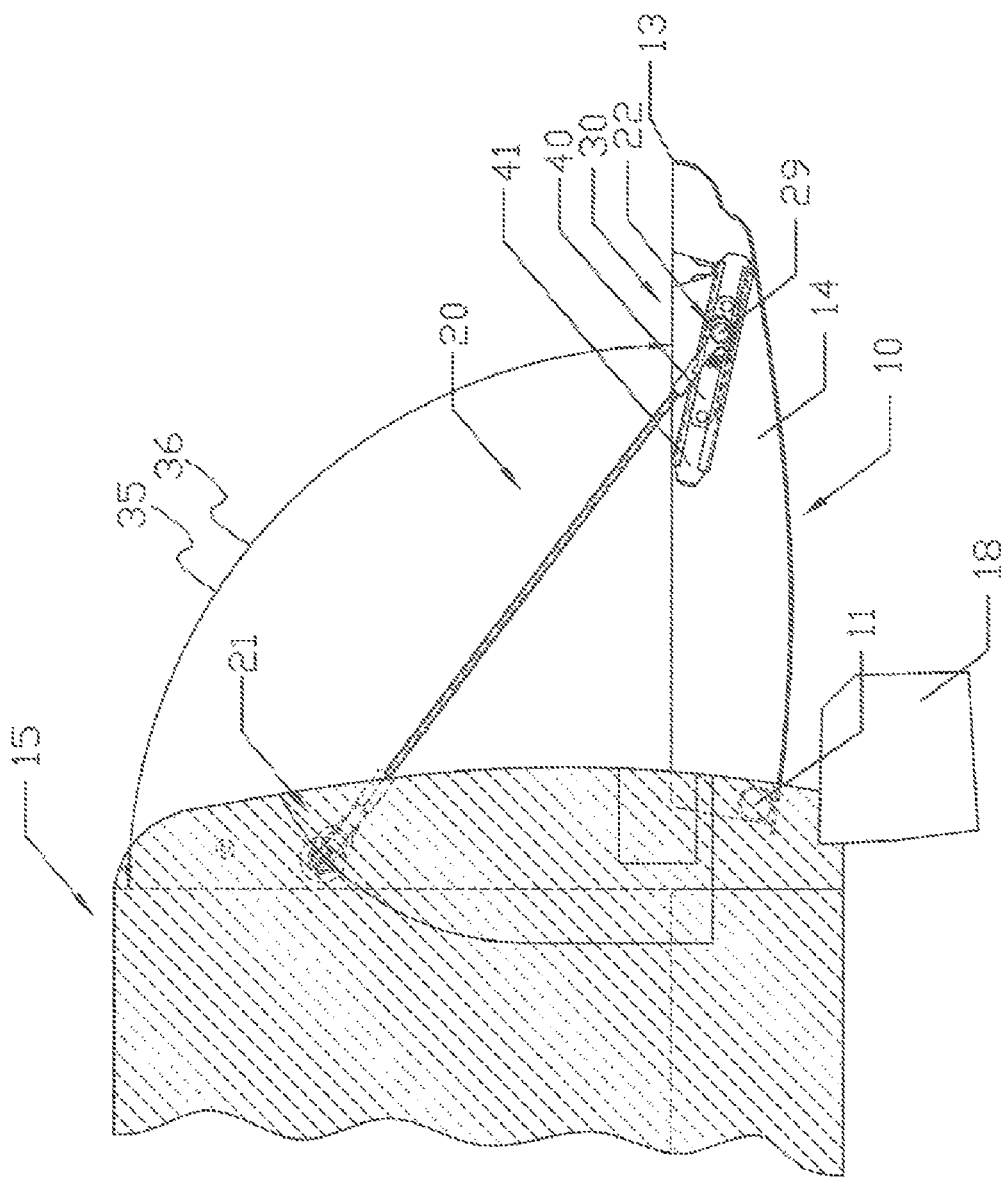

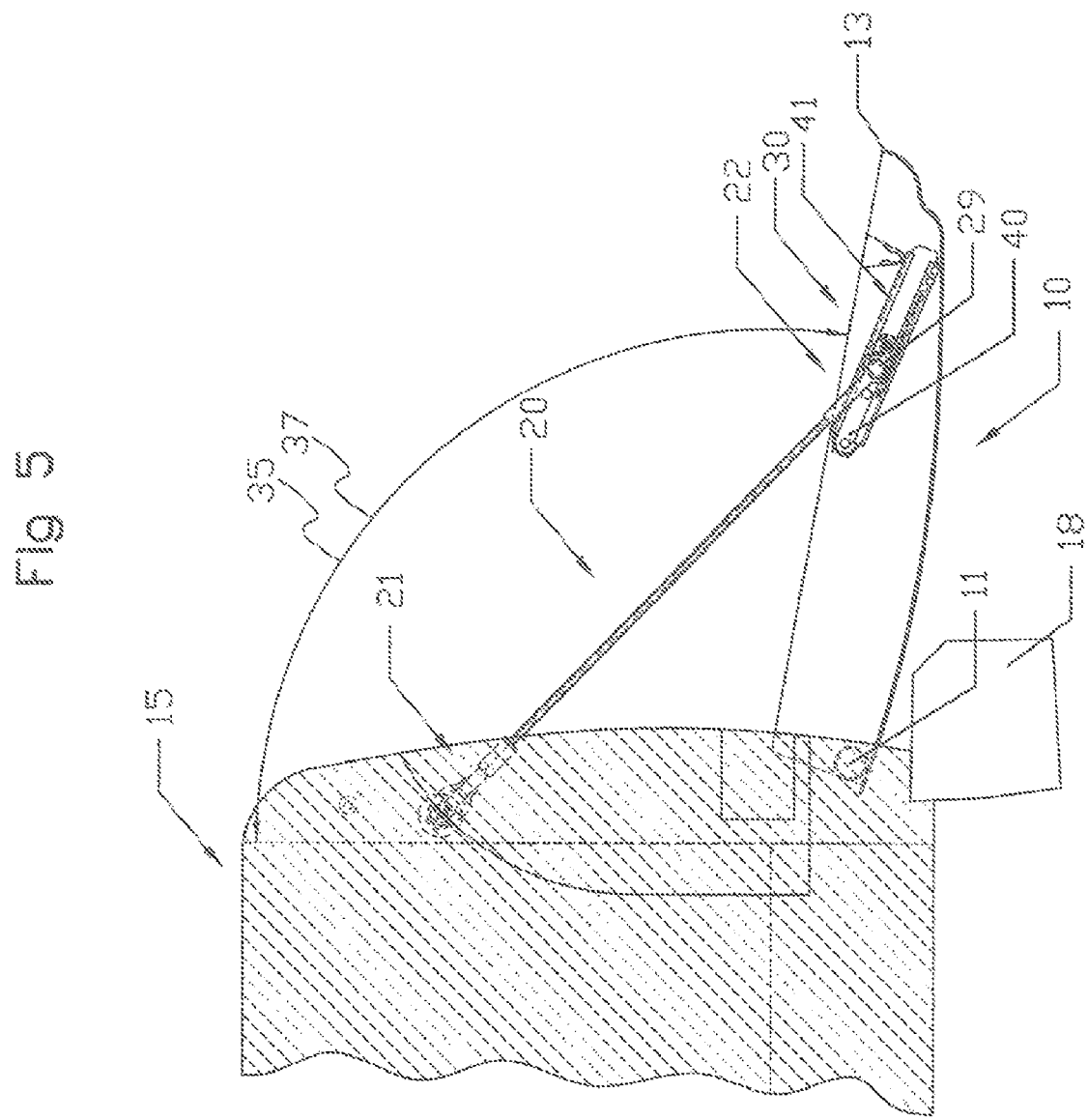

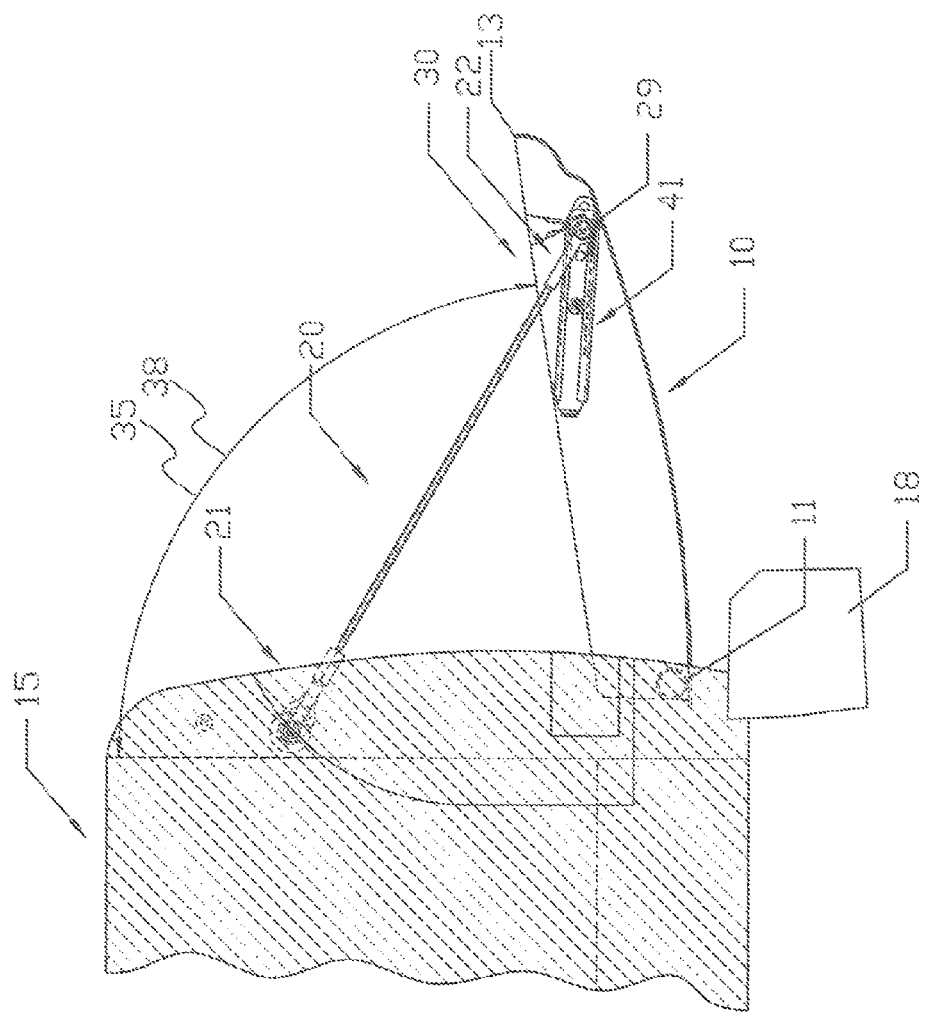

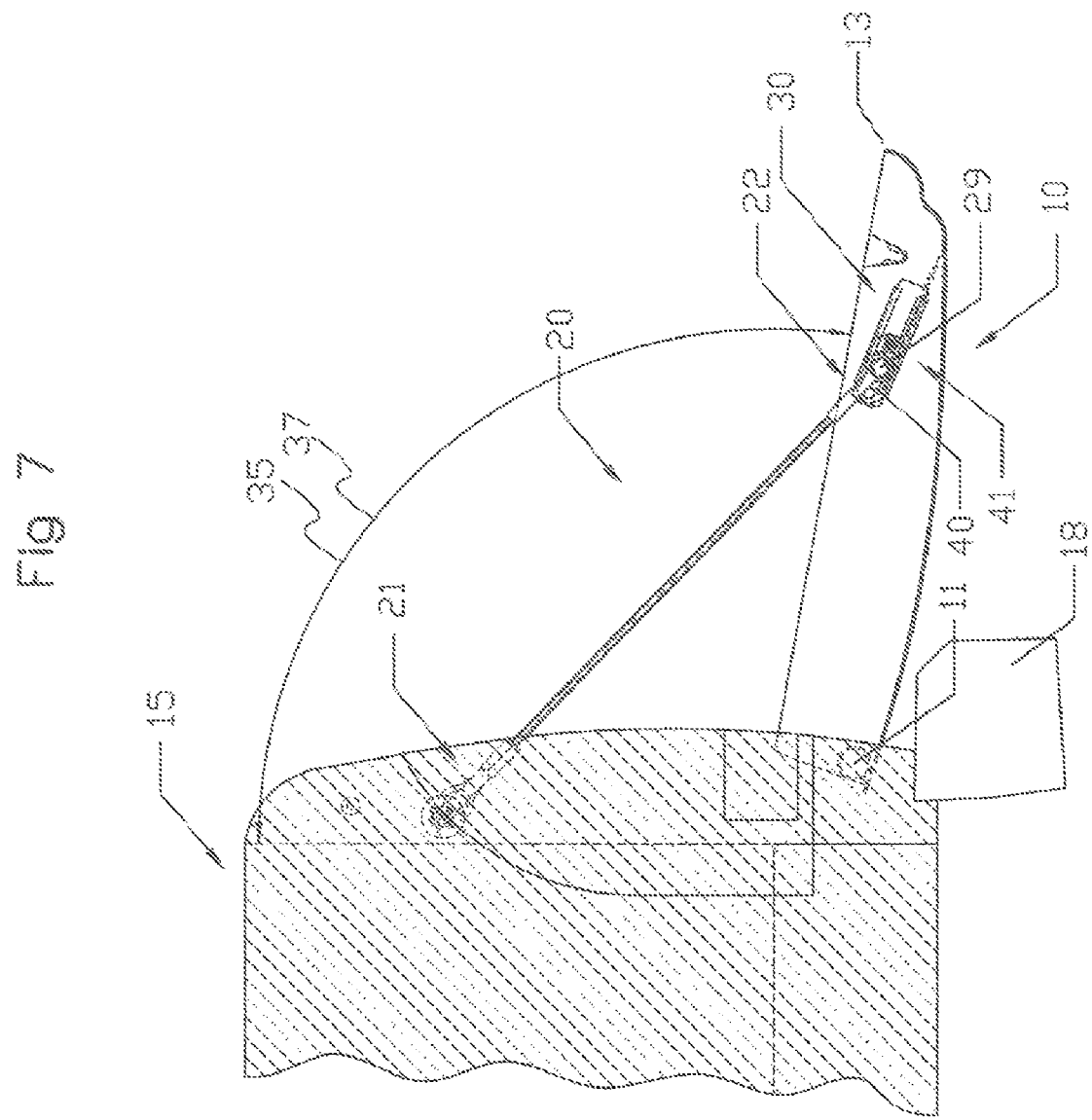

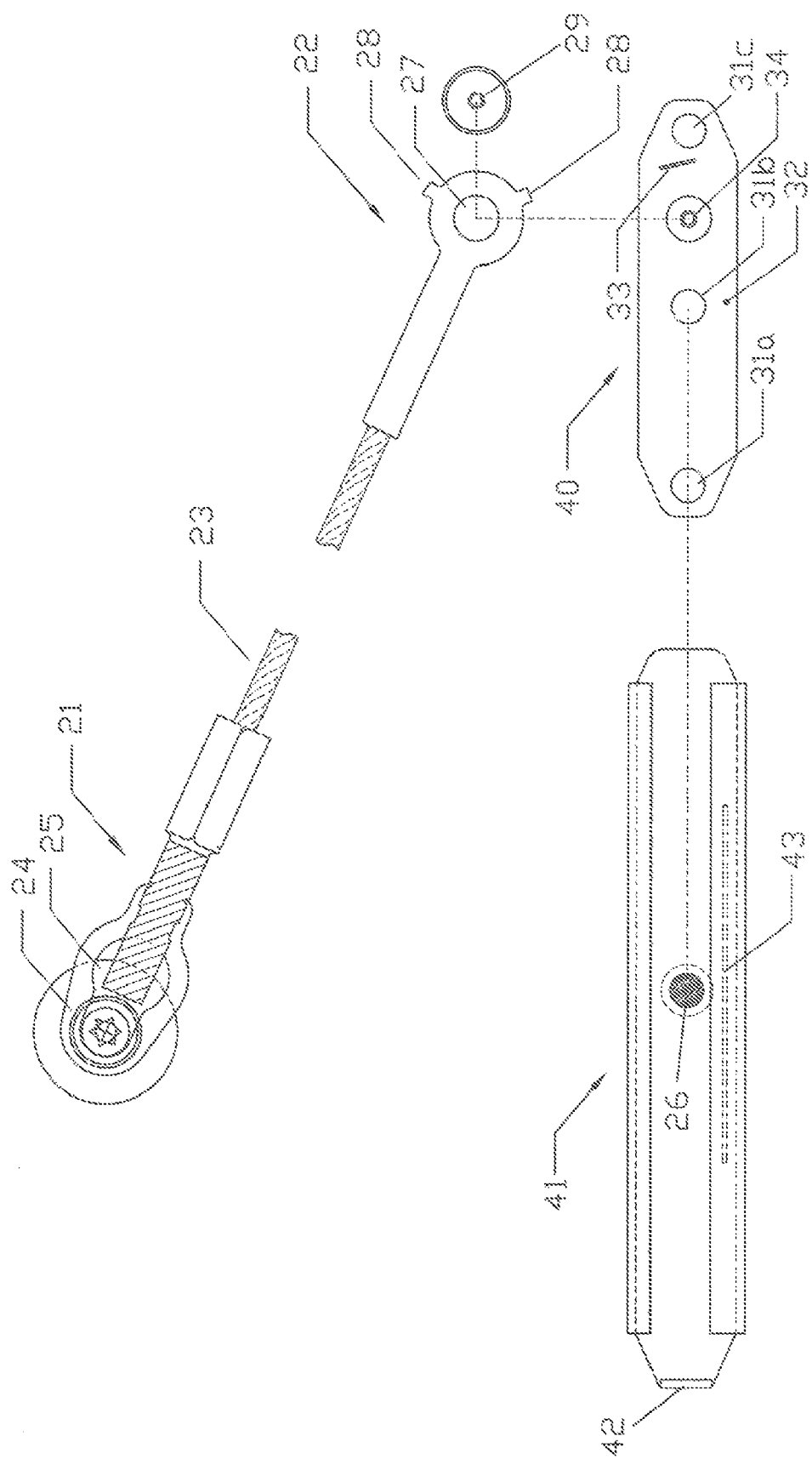

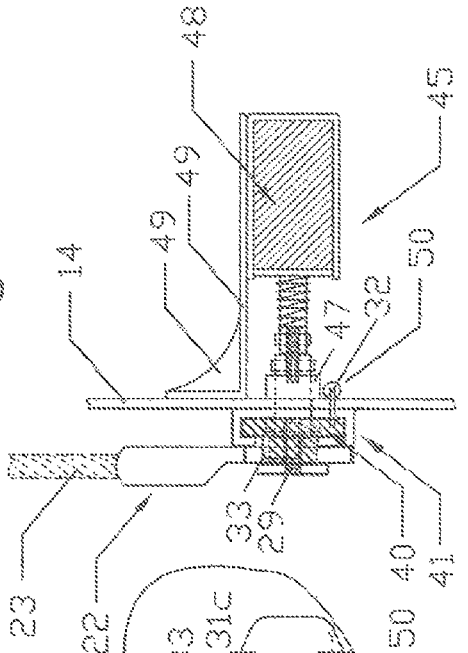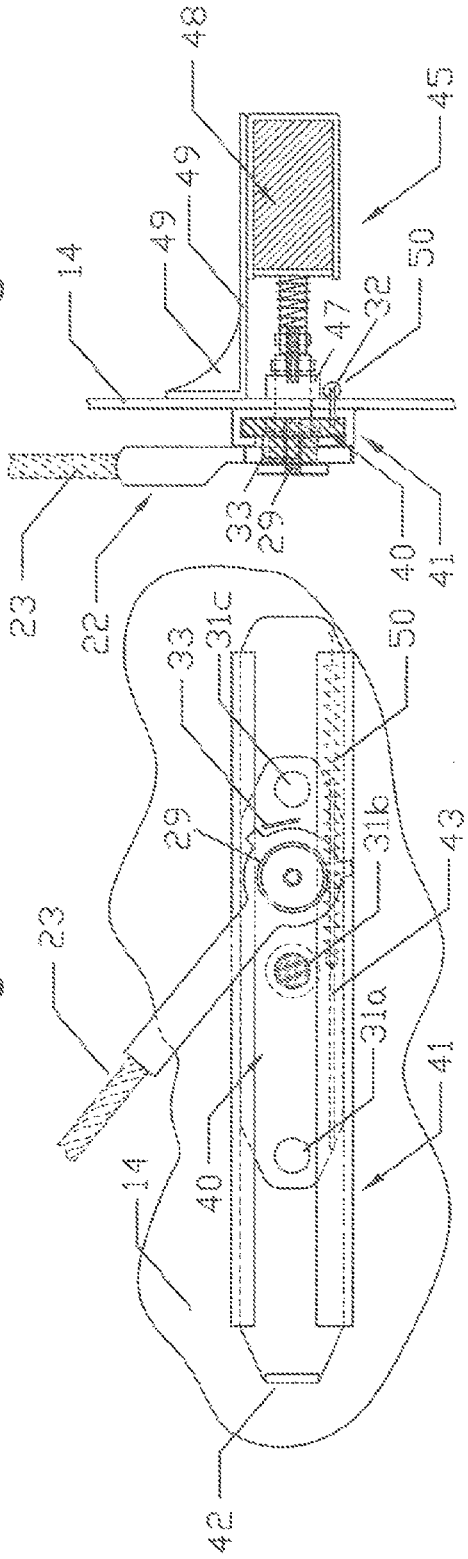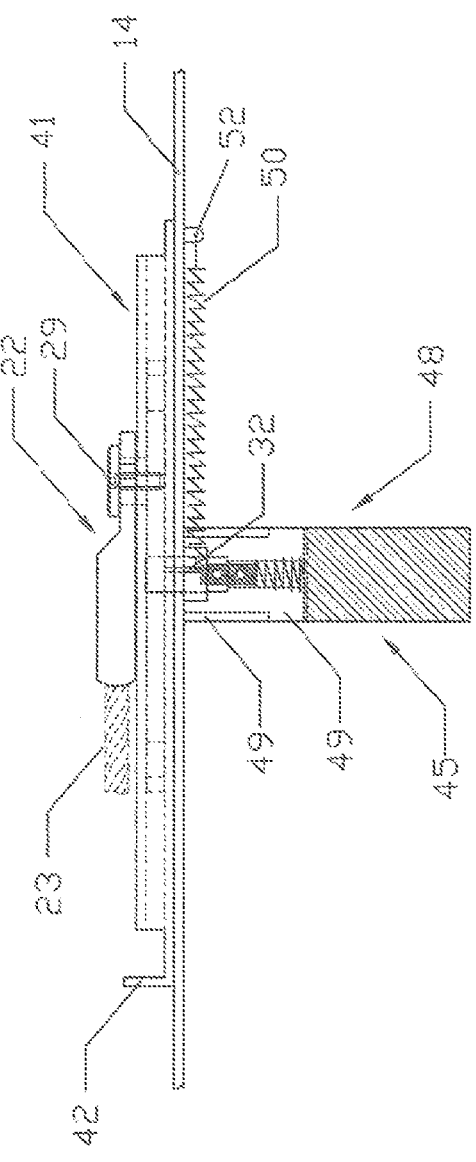

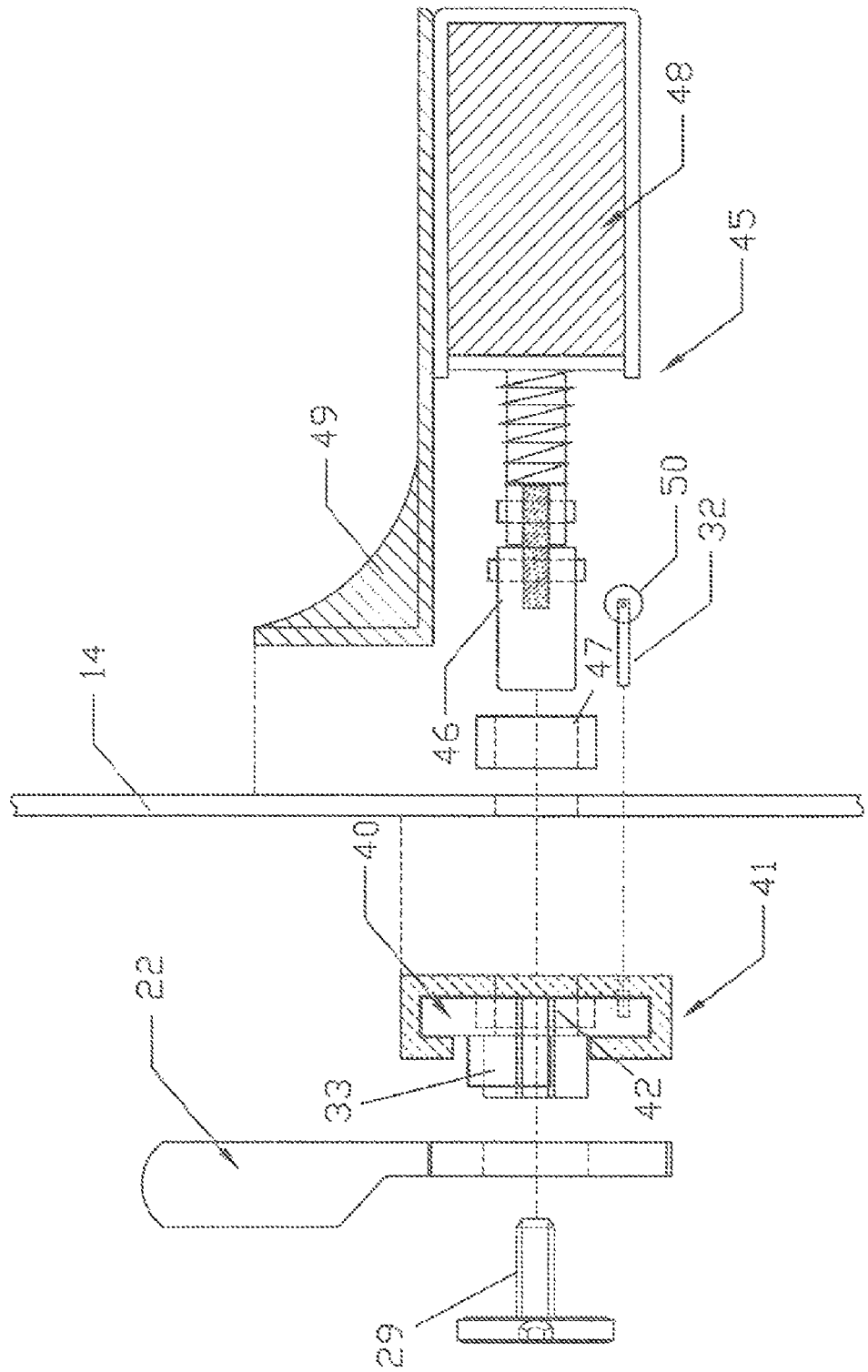

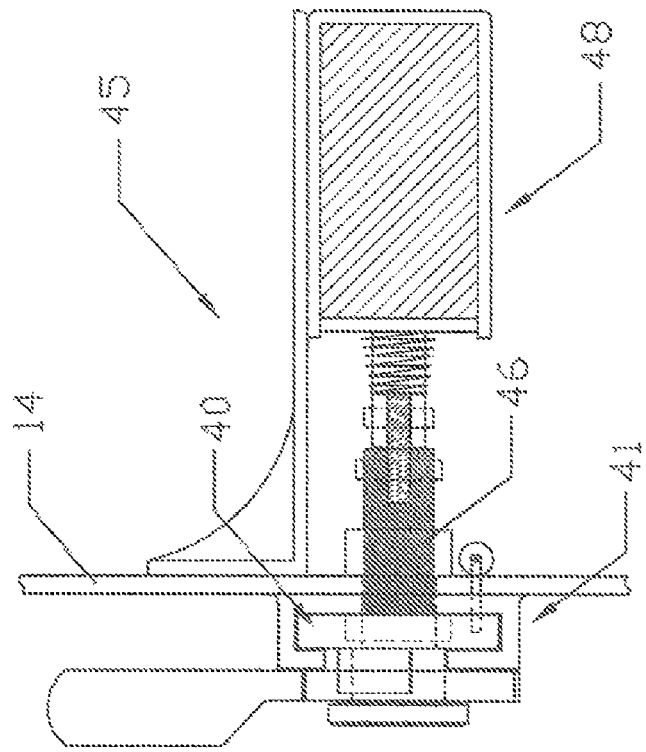
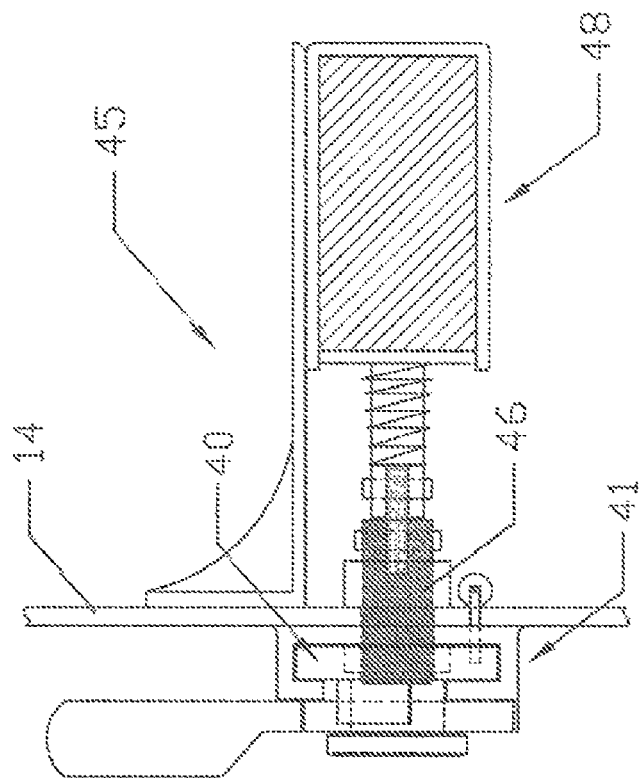
Fig 13a
Fig 13b

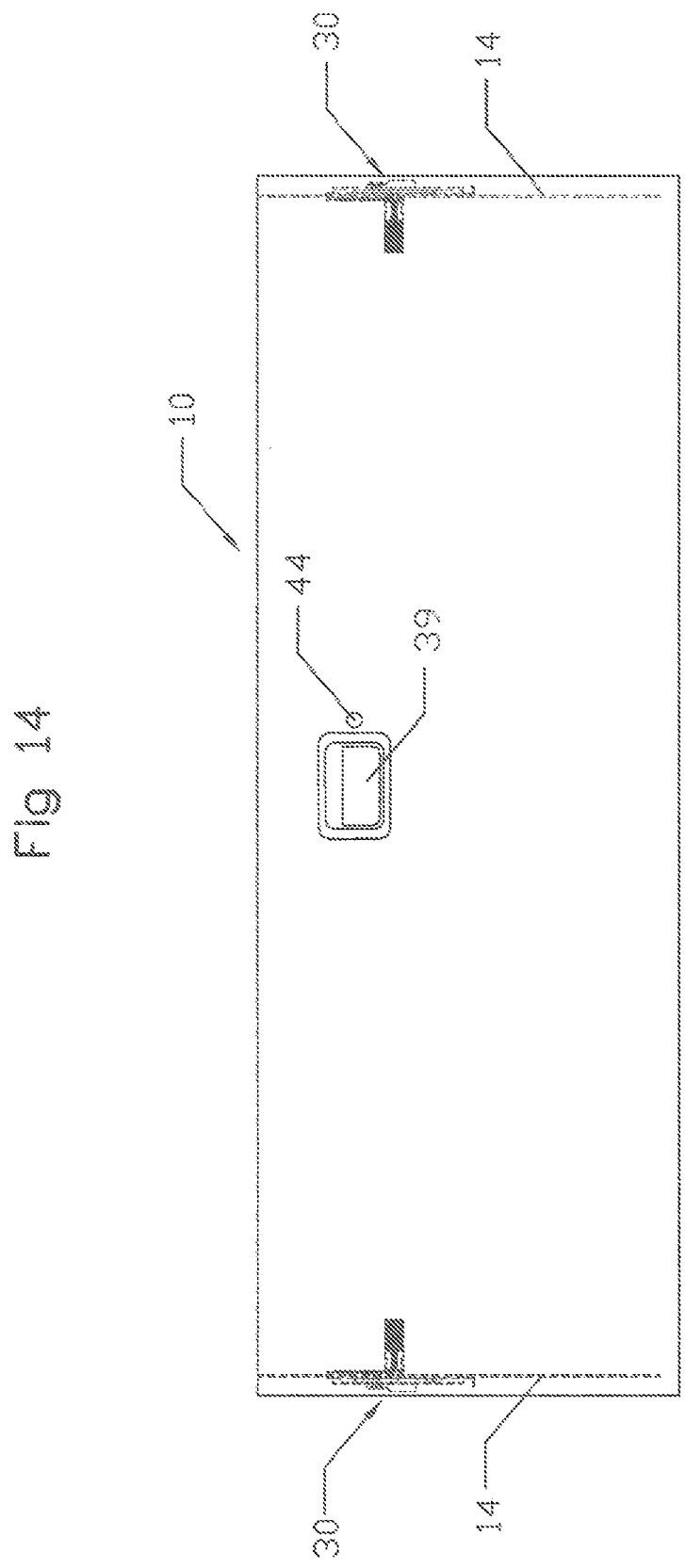

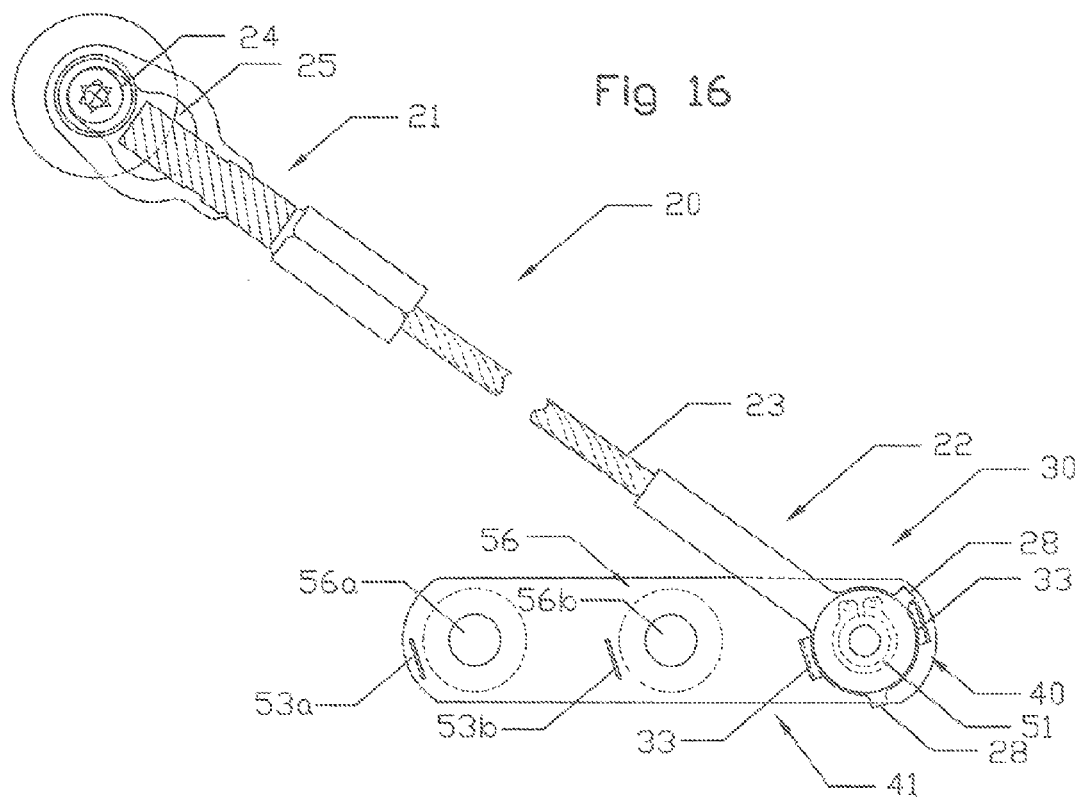
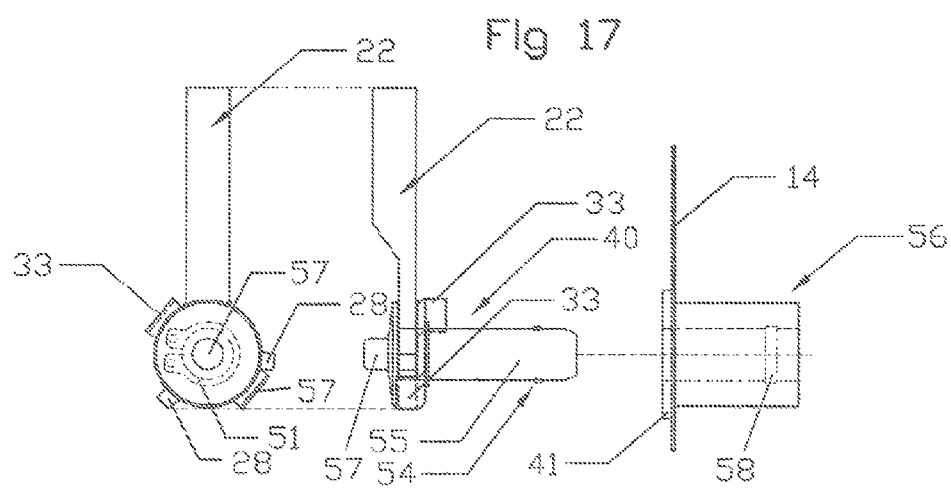

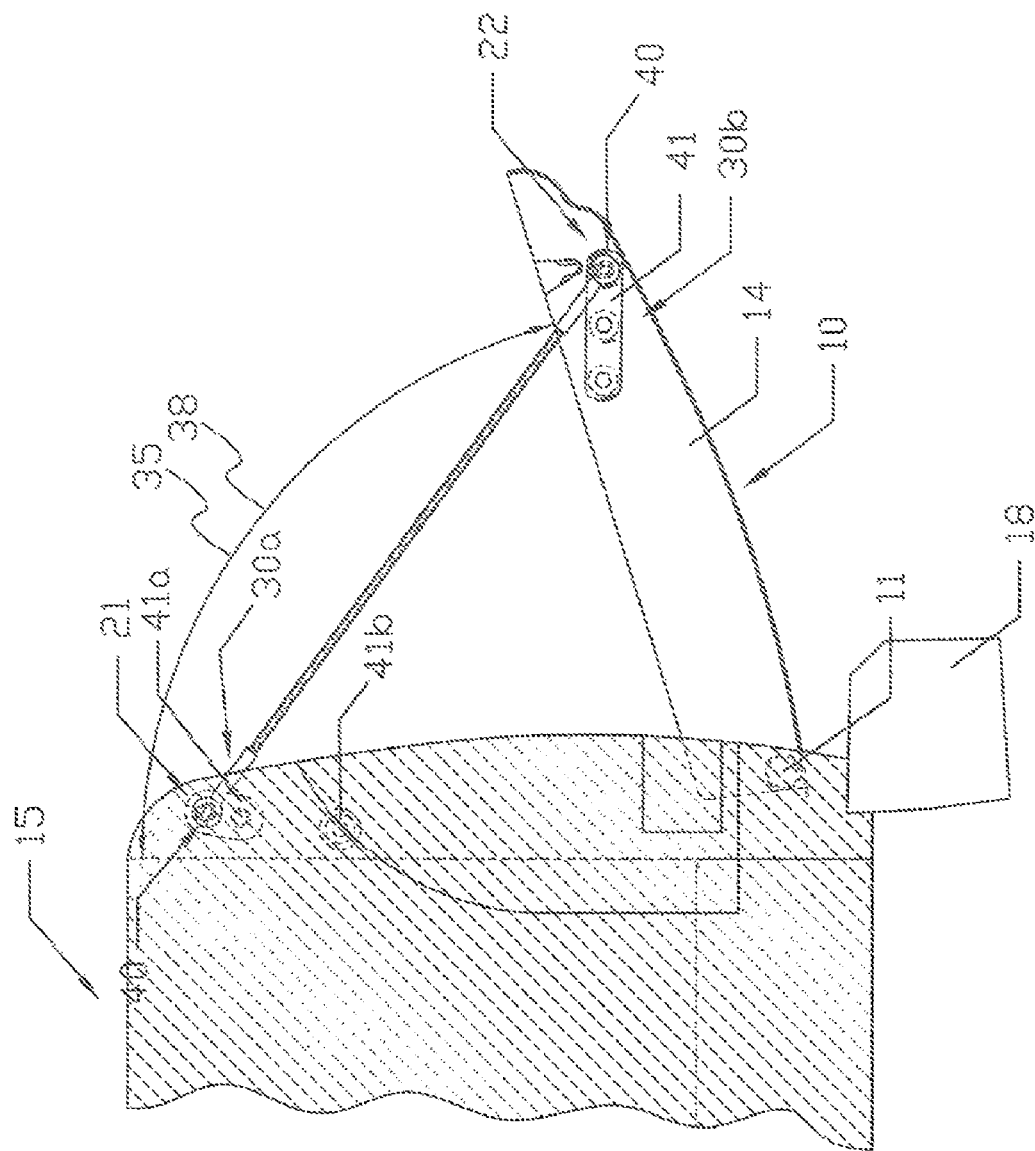

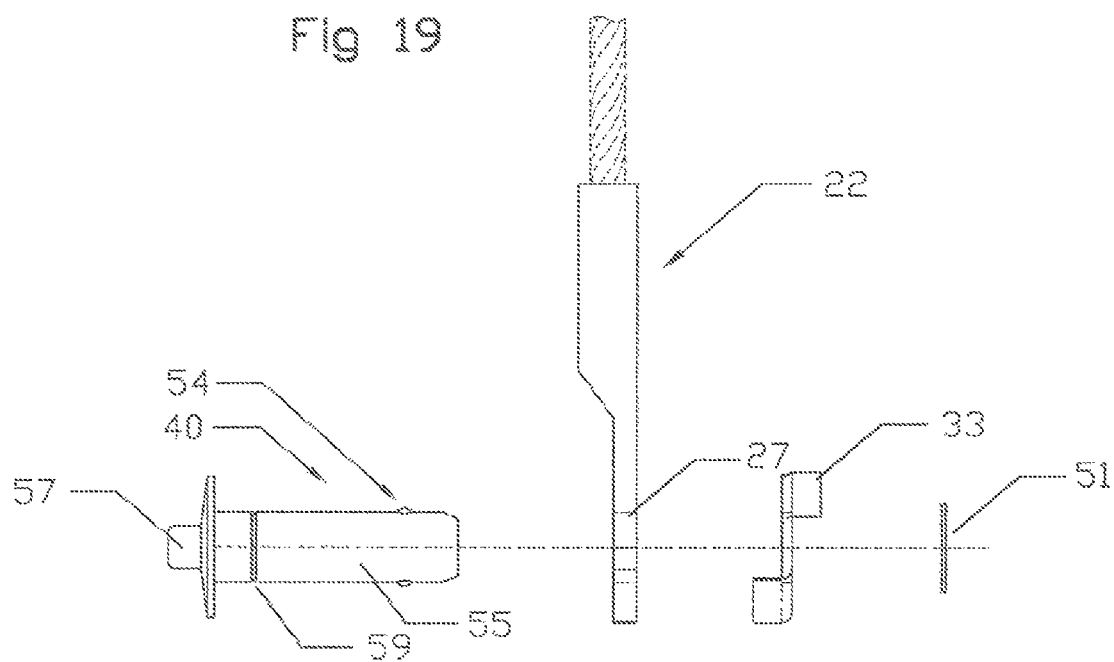
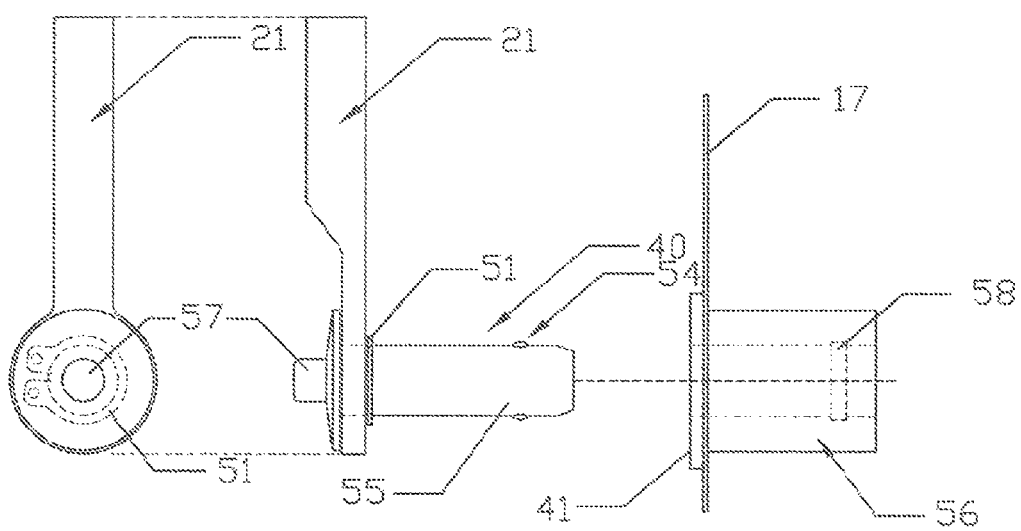

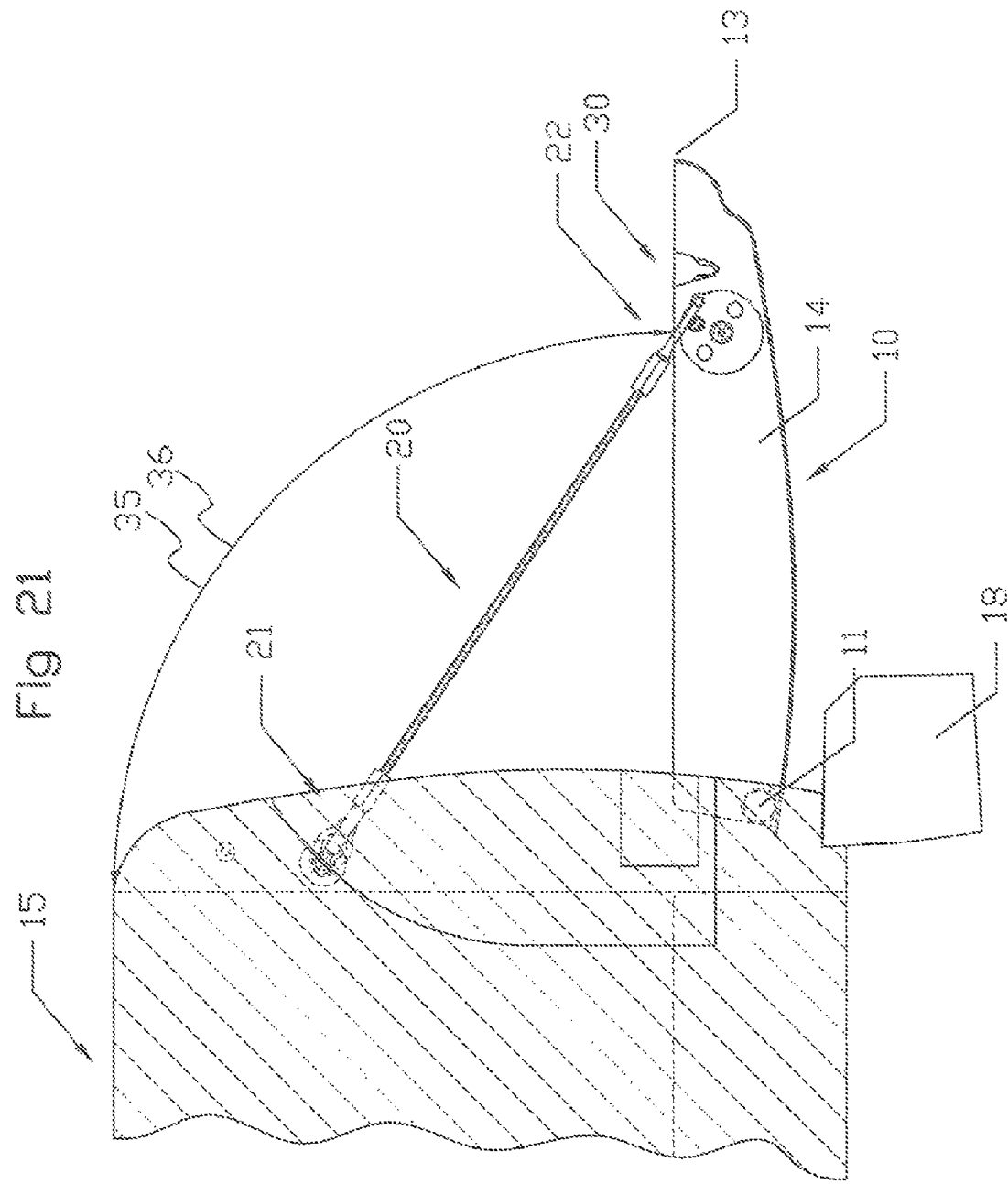

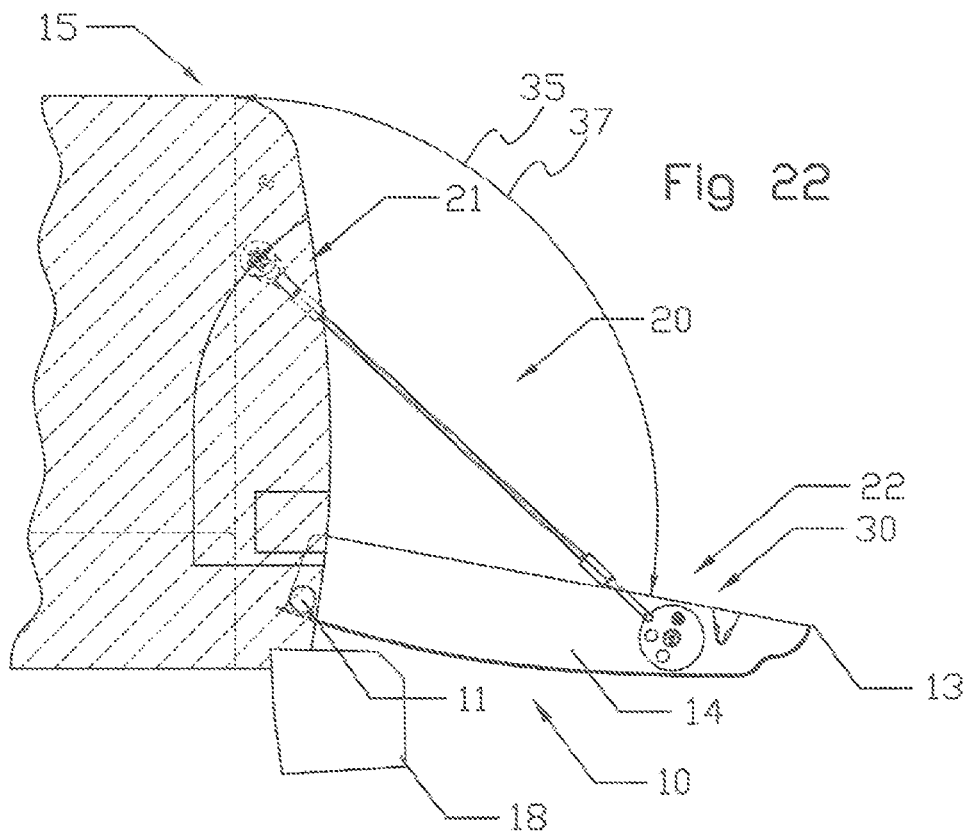
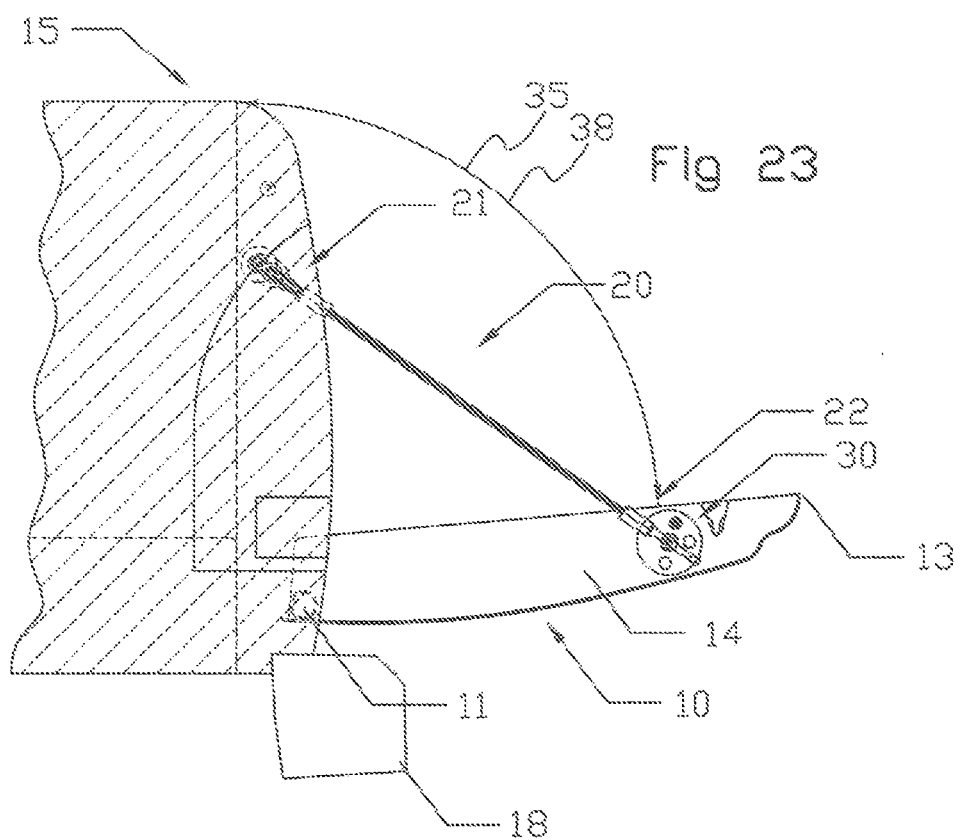

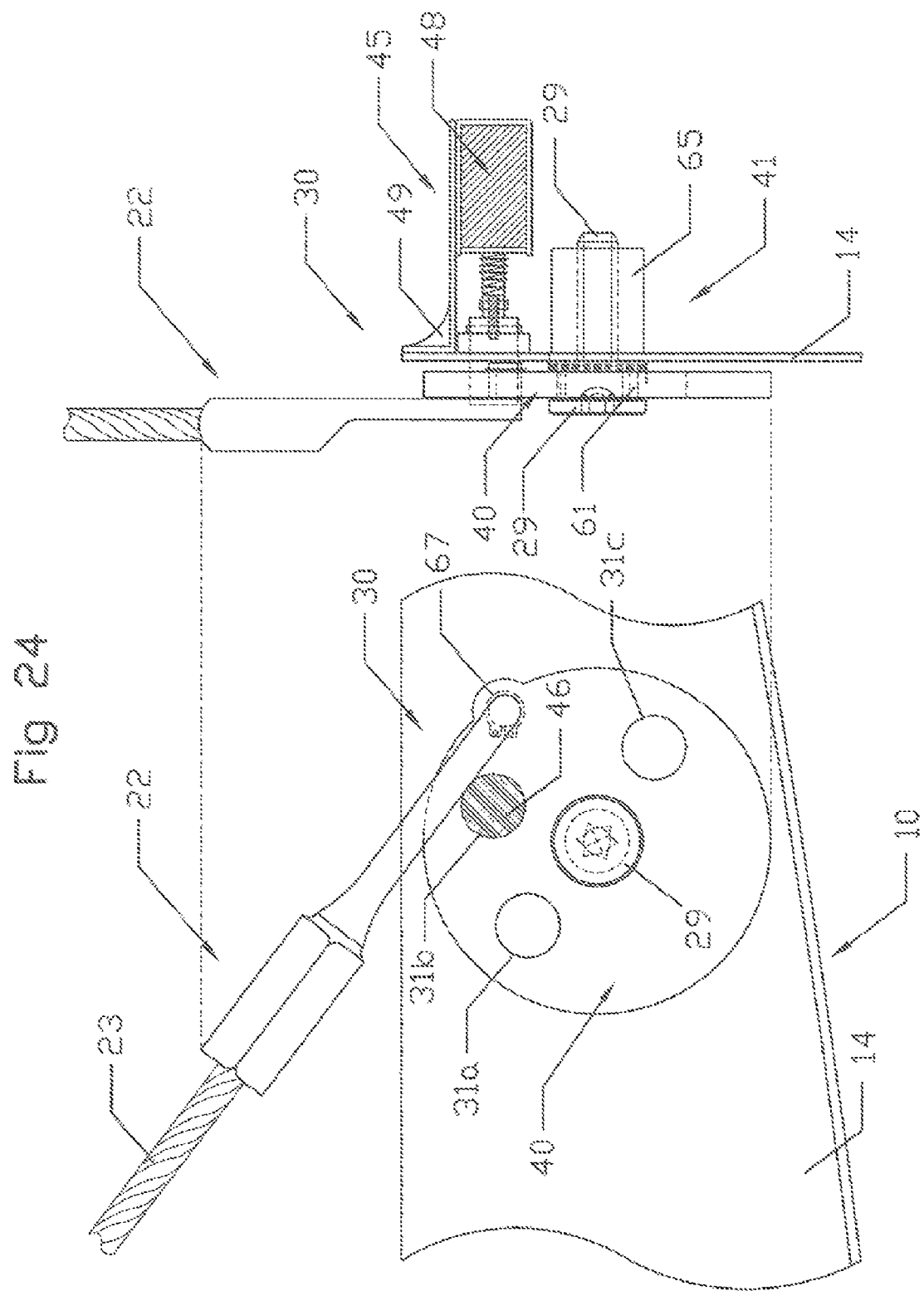

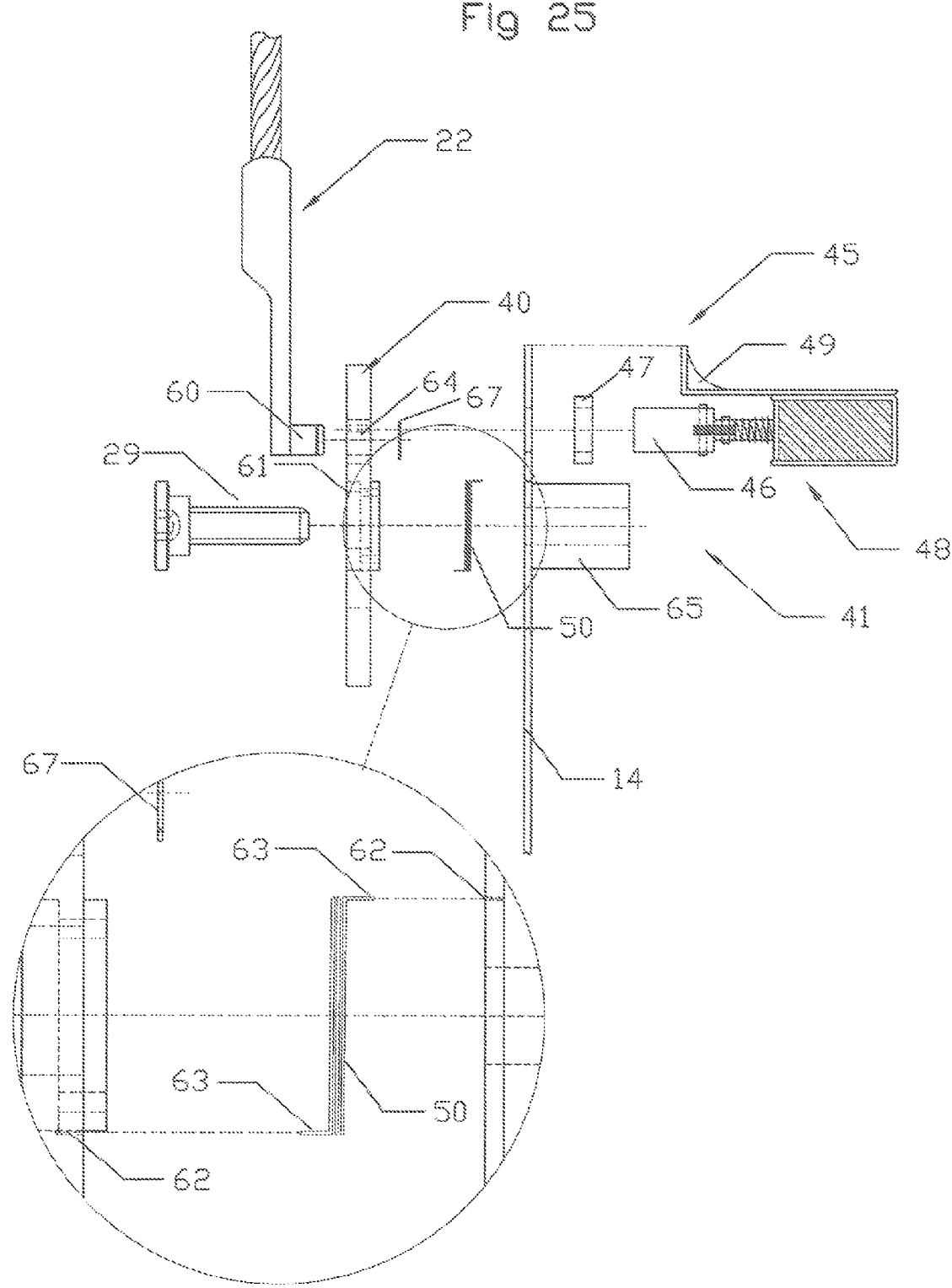

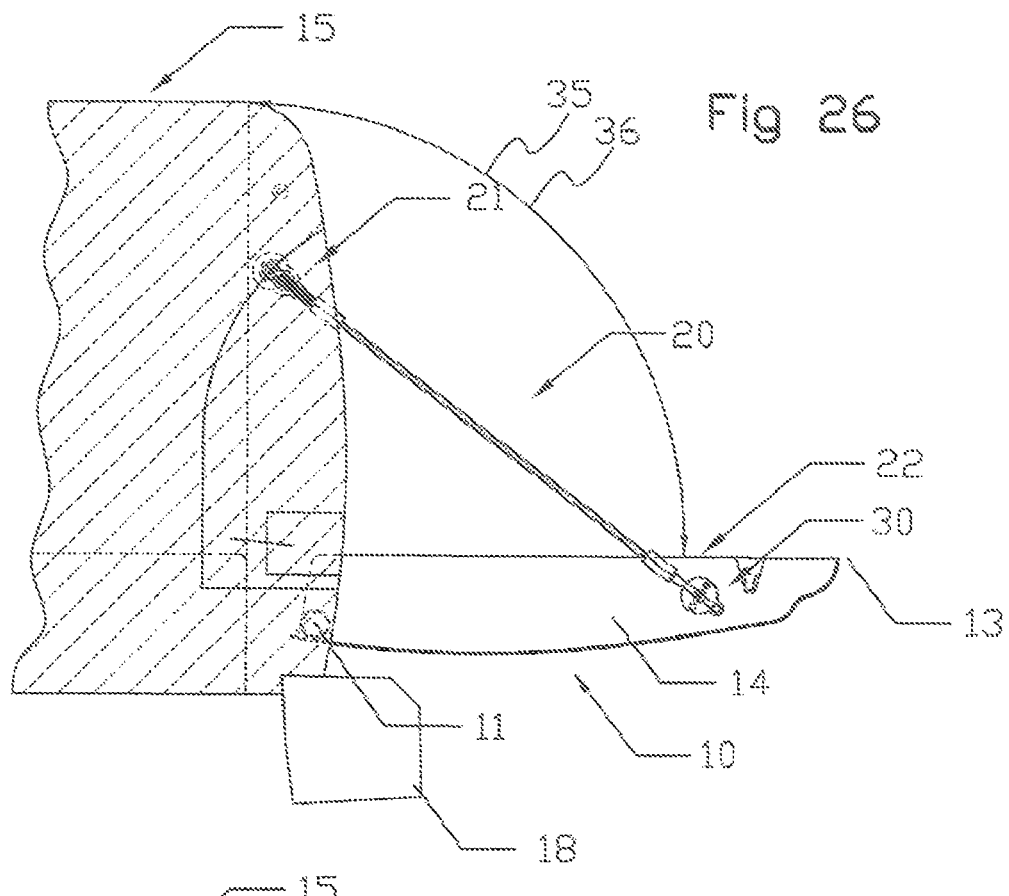
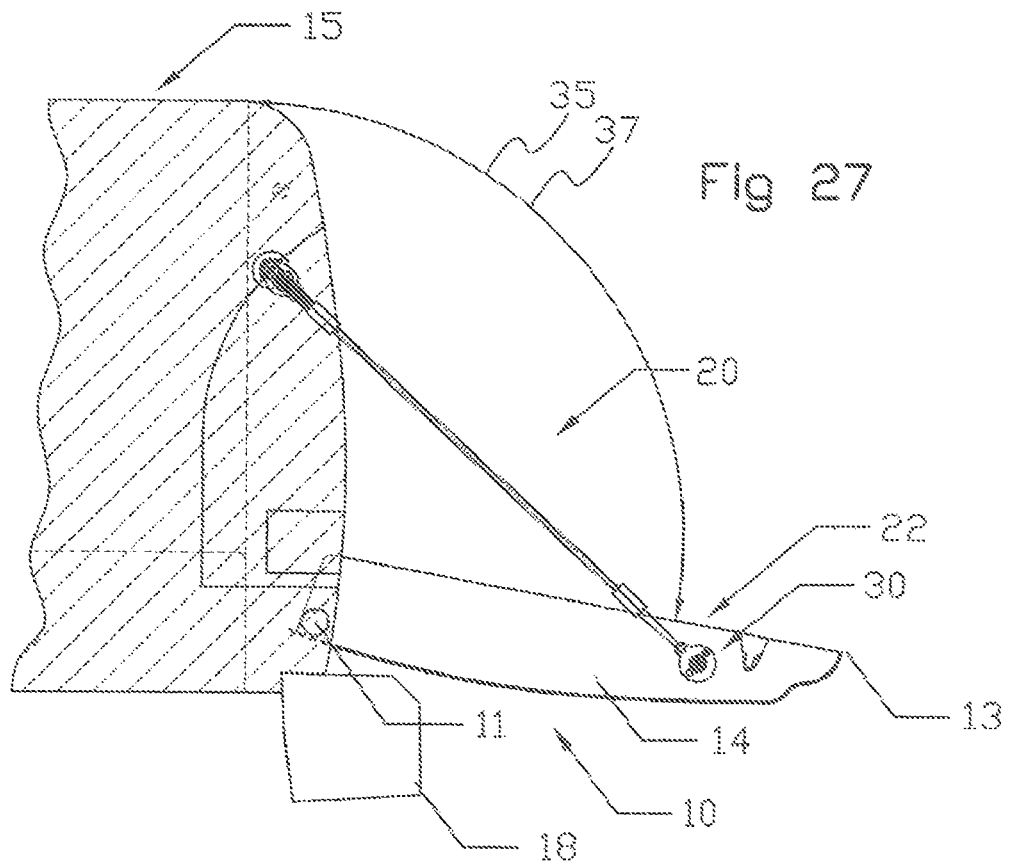

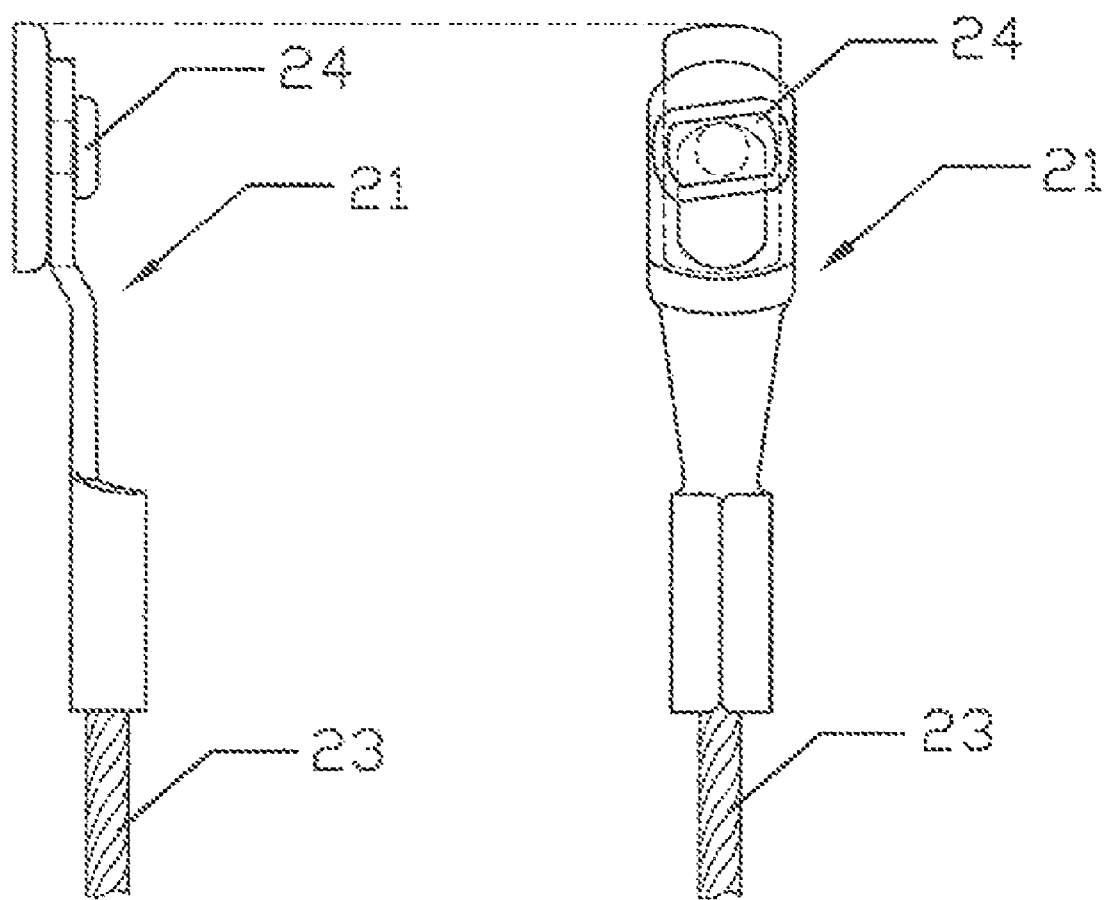

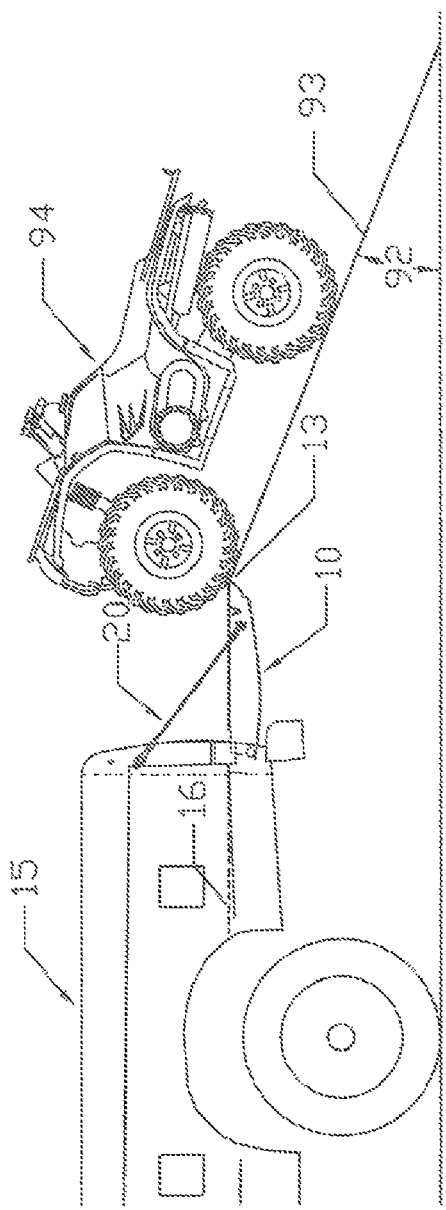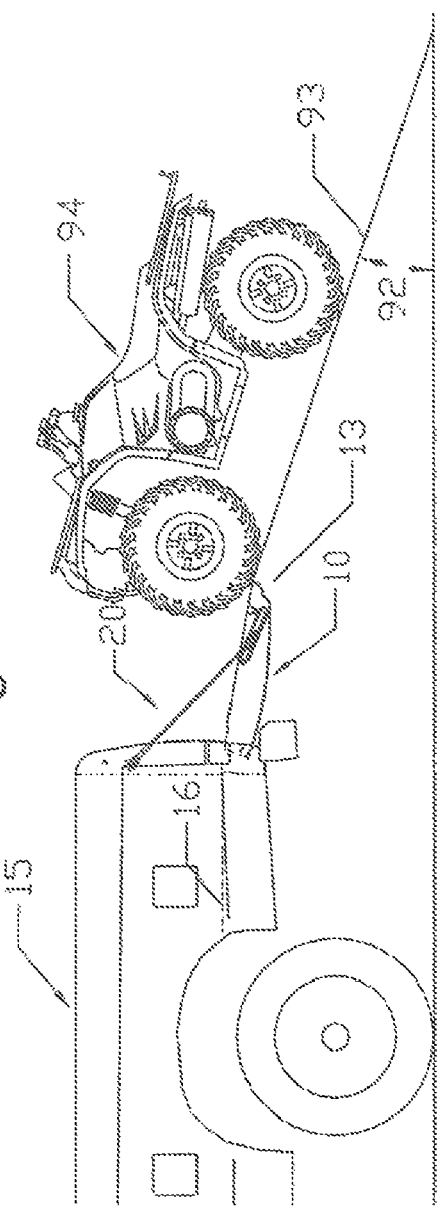

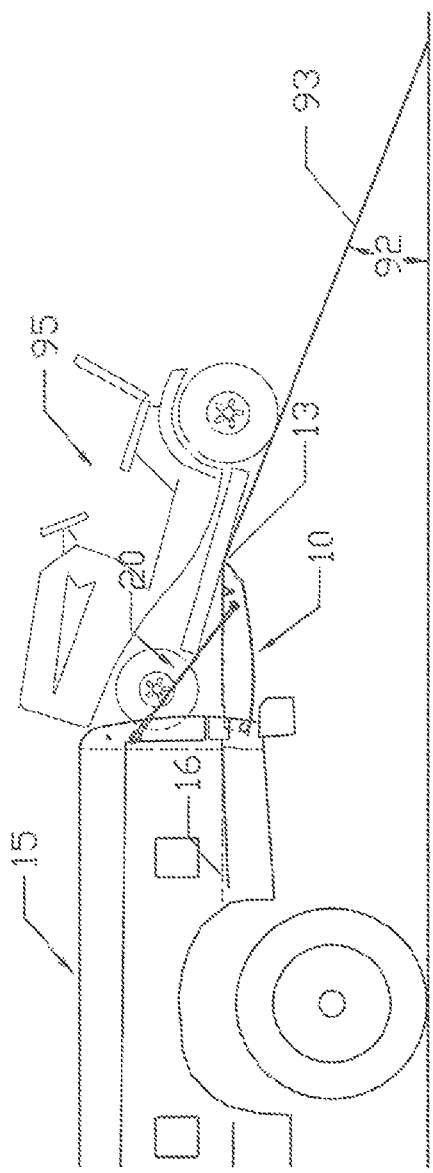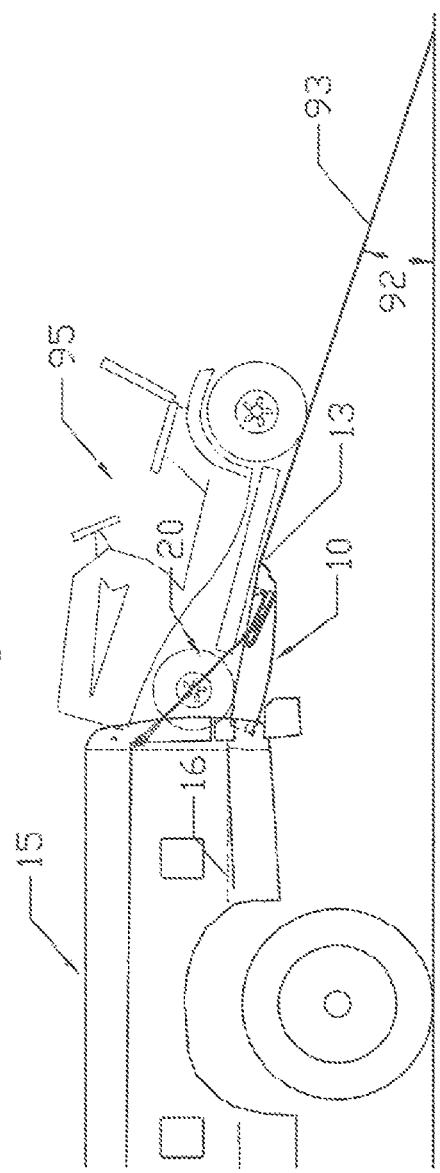

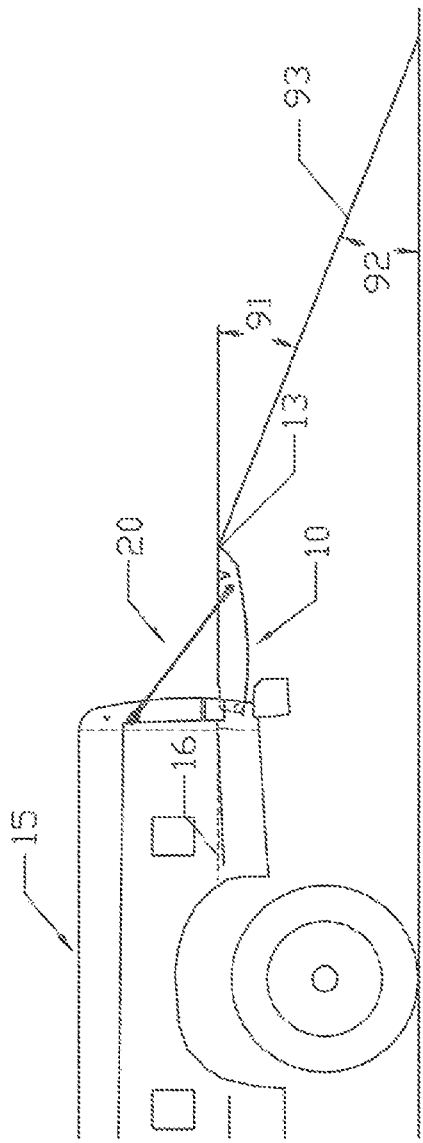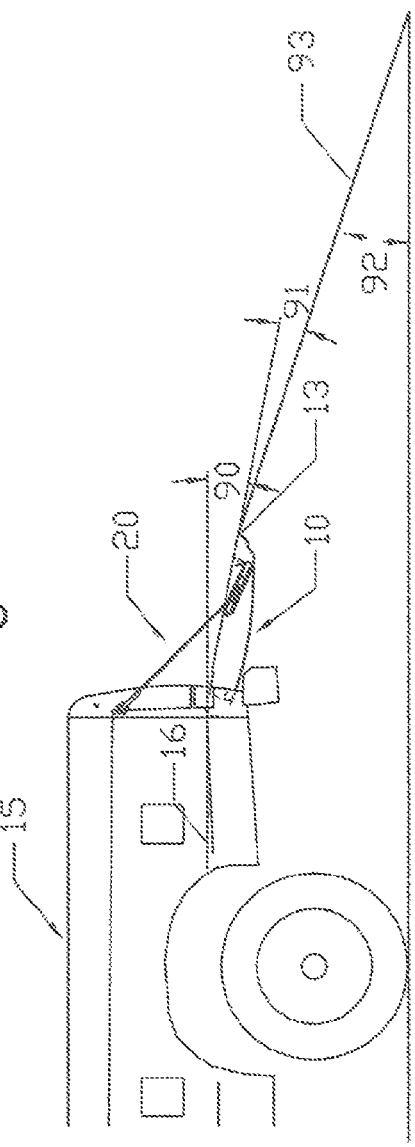

MULTI-POSITION TAILGATE ADJUSTMENT APPARATUS AND METHOD

BACKGROUND

1. Field of Invention

This invention relates to motor vehicles and utility trailers and, more particularly, to apparatus and methods for a multi-position tailgate adjustment mechanism facilitating suspension of a tailgate in multiple positions that each retain the tailgate's external appearance and full load-carrying capacity.

2. Prior Art

In certain situations, it may be desirable to have a low loading height on a vehicle. In the past, attempts to lower vehicle loading height have focused in two primary areas. First, attempts have been made to lower the bed height of certain vehicles. While this may work well for trailers and special purpose vehicles, it is problematic for multi-use vehicles like pickup trucks, which have certain structural limitations and clearance requirements. Second, attempts have been made to add hoists to vehicles. While hoists neutralize the need for a lower loading height by simply lifting the load for the user, they are typically large, heavy, and expensive. Thus, neither of these two areas of improvement is particularly helpful for the average pickup truck user.

Currently, many vehicles, including pickup trucks, have tailgates. However, a typical tailgate is of no assistance in raising or lowering vehicle loading height. Conventional tailgates pivot between a closed position and an open position. The open position is typically ninety degrees of rotation from the closed position. Accordingly, a typical tailgate in the open position forms an extension to the bed of the vehicle. Thus, the loading height of a vehicle with a tailgate is typically the height of the bed.

In view of the foregoing, what is needed is an inexpensive and unobtrusive apparatus and method for either raising or lowering the loading height of a vehicle like a common, everyday, pickup truck. Additionally, what is needed is a tailgate that retains its full load-bearing capacity in a partially open position, which position may provide increased retention of loads extending longer than the cargo area of the pickup truck.

SUMMARY

The present invention relates in selected embodiments to vehicles with tailgates such as, without limitation, pick-up trucks having tailgates that rotate about a horizontal pivot axis positioned proximate a lower edge of the tailgate. Certain devices in accordance with the present invention may provide an easy to use quick change, multi-position tailgate support and adjustor system. A tailgate support and adjustor system in accordance with the present invention may allow the tailgate to be used (e.g., loaded with weight) in multiple suspended positions. For example, in one embodiment, the tailgate may be suspended and used in a conventional open position, one or more open positions above the conventional open position, one or more positions below the conventional open position, or some combination thereof.

In selected embodiments, an adjustor may form an interface between a tailgate support and a vehicle. As such, an adjustor may be viewed as part of a tailgate support, as part of the vehicle (e.g., tailgate, side wall, etc.), or as an independent component separable from both the tailgate support and the vehicle. One or more adjustors (e.g., one for each tailgate support) in accordance with the present invention may be installed on a vehicle in an initial manufacturing process or in an aftermarket installation or modification.

An adjustor may include a traveler and a base. A traveler may be configured to move between various positions or locations on or with respect to a base. A base may, in turn, be formed in, mounted on, or fixed with respect to a portion of the vehicle. For example, a base may be formed in, mounted on, or otherwise fixed with respect to the tailgate. A first end of a tailgate support may engage the side wall of the vehicle, while a second end of the tailgate support engages the traveler. Accordingly, by manipulating the position of the traveler with respect to the base, the location of suspension for the tailgate may be adjusted.

Alternatively, a base may be formed in, mounted on, or fixed with respect to the side wall of a vehicle. In such embodiments, a first end of a tailgate support may be connected to the traveler, while a second end of the tailgate support engages the tailgate. In still other embodiments, adjustors may be positioned at each end of a tailgate support (i.e., one adjustor on the side wall and another on the tailgate). In such embodiments, a first end of a tailgate support may be connected to the traveler of one adjustor, while a second end of the tailgate support engages the traveler of the other adjustor.

In all such embodiments, by manipulating the position of the traveler or travelers with respect to the respective base or bases, the location of suspension for the tailgate may be adjusted. This may be done by freeing the traveler with respect to the base, moving the traveler with respect to the base from a first location to a second location, and then fixing the traveler with respect to the base.

By supporting or suspending a tailgate in an open position that is more than ninety degrees from the closed position, a tailgate support and adjustor system may lower the loading height of the corresponding vehicle. A lower loading height may reduce the incline angle of loading ramps commonly used to load items such as motorcycles, ATVs, small tractors, and the like. Reducing the incline of such ramps may make it easier and safer to load and unload such items. Additionally, a tailgate with a lower leading edge may support loading of items with low ground clearance (e.g., riding lawn mowers), which would normally hang on the leading edge of a conventional tailgate at the location where the ramps rest.

By supporting or suspending a tailgate in an open position that is less than ninety degrees from the closed position, a tailgate support and adjustor system may resist rearward movement of cargo that is longer than the cargo area of the corresponding vehicle. Additionally, a tailgate with a higher leading edge may facilitate transfer of items between a cargo area and surfaces higher than the cargo area (e.g., loading docks).

Selected embodiments in accordance with the present invention may comprise systems or packages including a new bumper or bumper relocation kit. These new bumpers or bumper relocation kits may accommodate a lower tailgate position than conventional bumpers. Such bumpers and bumper relocation kits may support greater lowering by a tailgate support and adjustor system in accordance with the present invention.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 1 is a perspective view of one embodiment of a truck bed with a tailgate in a conventional open position;

FIG. 2 is a partial, rear elevation view of a pickup truck having a tailgate in the closed position illustrating how a tailgate support and adjustor in accordance with the present invention fits within the void between the side edge of the tailgate and the side wall of the truck bed;

FIG. 3 is a partial, side elevation view of a pickup truck having a tailgate in the closed position illustrating how a tailgate support and adjustor in accordance with the present invention fits within the void between the side edge of the tailgate and the side wall of the truck bed;

FIG. 4 is a side elevation view of one embodiment of a three-position tailgate support and adjustor system in accordance with the present invention suspending a tailgate in the conventional open position;

FIG. 5 is a side elevation view of the tailgate support and adjustor system of FIG. 4 suspending a tailgate below the conventional open position;

FIG. 6 is a side elevation view of the tailgate support and adjustor system of FIG. 4 suspending a tailgate above the conventional open position;

FIG. 7 is a side elevation view of one embodiment of a two-position tailgate support and adjustor system in accordance with the present invention suspending a tailgate below the conventional open position;

FIG. 8 is an exploded, partial, side elevation view of the tailgate support and adjustor system of FIG. 4;

FIG. 9 is a partial, side elevation view of the tailgate support and adjustor system of FIG. 4 with the traveler locked in an intermediate position;

FIG. 10 is a rear elevation view of the tailgate support and adjustor system of FIG. 9;

FIG. 11 is a top plan view of the tailgate support and adjustor system of FIG. 9;

FIG. 12 is an exploded, partial, rear elevation view of the tailgate support and adjustor system of FIG. 4;

FIG. 13a is a partial, rear elevation view of the tailgate support and adjustor system of FIG. 4 with the lock engaged to fix the traveler with respect to the base;

FIG. 13b is a partial, rear elevation view of the tailgate support and adjustor system of FIG. 4 with the lock disengaged and the traveler free to move with respect to the base;

FIG. 14 is a rear elevation view of one embodiment of a tailgate in accordance with the present invention equipped with an actuator button proximate the tailgate release lever;

FIG. 16 is a partial, side elevation view of the tailgate support and adjustor system of FIG. 15 with the traveler locked in one of the three positions;

FIG. 17 is a partially exploded, top plan view of a portion of the tailgate support and adjustor system of FIG. 15;

FIG. 18 is a side elevation view of one embodiment of a tailgate support and multi-adjustor system in accordance with the present invention suspending a tailgate above the conventional open position;

FIG. 19 is an exploded, partial, top plan view of the second end of the tailgate support of FIG. 18;

FIG. 20 is an exploded, partial, top plan view of the first end of the tailgate support of FIG. 18;

FIG. 21 is a side elevation view of another alternative embodiment of a three-position tailgate support and adjustor system in accordance with the present invention suspending a tailgate in the conventional open position;

FIG. 22 is a side elevation view of the tailgate support and adjustor system of FIG. 21 suspending a tailgate below the conventional open position;

FIG. 23 is a side elevation view of the tailgate support and adjustor system of FIG. 21 suspending a tailgate above the conventional open position;

FIG. 24 provides partial, rear and side elevation views of the tailgate support and adjustor system of FIG. 21;

FIG. 25 is an exploded, rear elevation view of the tailgate support and adjustor system of FIG. 21;

FIG. 26 is a side elevation view of an alternative embodiment of a two-position tailgate support and adjustor system in accordance with the present invention suspending a tailgate in the conventional open position;

FIG. 27 is a side elevation view of the tailgate support and adjustor system of FIG. 26 suspending a tailgate below the conventional open position;

FIG. 29 provides side elevation and top plan views of an alternative embodiment of a first end of a tailgate support engaging a stud in accordance with the present invention;

FIG. 30 is a schematic diagram illustrating the loading of an ATV onto a tailgate suspended in a conventional open position;

FIG. 31 is a schematic diagram illustrating the loading of an ATV onto a tailgate suspended, by a tailgate support and adjustor system in accordance with the present invention, below a conventional open position;

FIG. 32 is a schematic diagram illustrating the loading of a riding lawn mower onto a tailgate suspended in a conventional open position;

FIG. 33 is a schematic diagram illustrating the loading of a riding lawn mower onto a tailgate suspended, by a tailgate support and adjustor system in accordance with the present invention, below a conventional open position;

FIG. 34 is a schematic diagram illustrating the break-over angle of a tailgate suspended in a conventional open position;

FIG. 35 is a schematic diagram illustrating the break-over angle of a tailgate suspended, by a tailgate support and adjustor system in accordance with the present invention, below a conventional open position;

Figure 15:
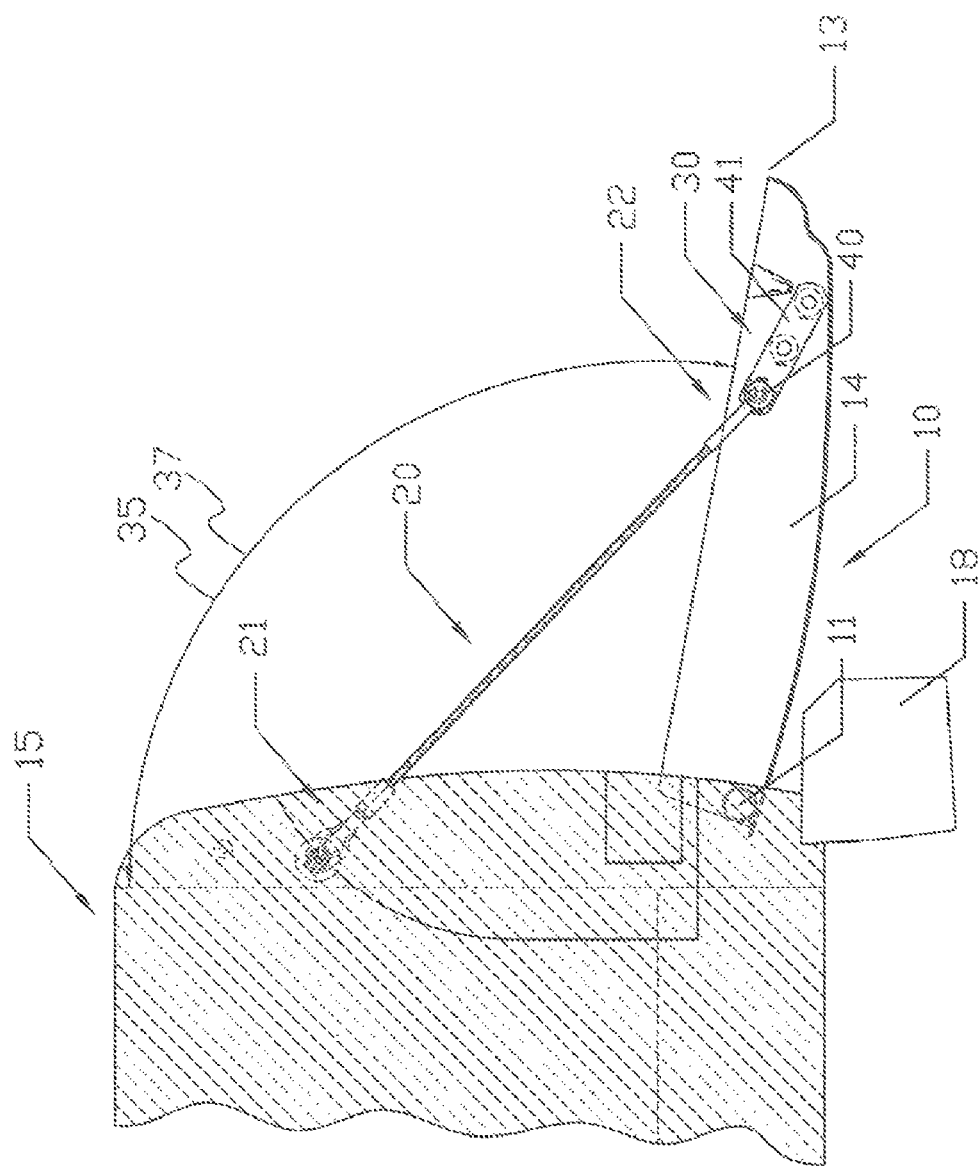
FIG. 15 is a side elevation view of an alternative embodiment of a three-position tailgate support and adjustor system in accordance with the present invention suspending a tailgate below the conventional open position.

KEY FOR REFERENCE NUMERALS
CONTAINED IN DRAWINGS

10—tailgate
11—tailgate hinge pivot
12—pivot edge
13—leading edge or top edge
14—tailgate side
15—cargo area or truck bed
16—bed floor
17—bed side or side wall
18—bumper
19—void between bed side and tailgate edge when tailgate is closed
20—tailgate support
21—first end of tailgate support
22—second end of tailgate support
23—cable
24—stud
25—aperture
26—locking aperture
27—aperture
28—rotation stop located on second end of tailgate support
29—fastener
30—adjustor
31—aperture
32—mount or attachment stud for biasing member
33—rotation stop on traveler
34—aperture
35—opening angle
36—first value of opening angle
37—second value of opening angle
38—third value of opening angle
39—release handle
40—traveler
41—base
42—traveler stop
43—slot
44—actuator for releasing lock or locks
45—lock
46—locking pin
47—pin boss
48—solenoid
49—solenoid frame
50—biasing member
51—retaining ring
52—attachment stud
53—aperture in base
54—detent mechanism
55—pin
56—socket
57—detent release button
58—groove for detent mechanism
59—groove for locking ring
60—post
61—bushing
62—apertures
63—tabs or extensions
64—aperture in traveler for pivotably receiving post on end of tailgate support
65—receiver
67—retaining ring
90—tailgate decline angle
91—break over angle
92—loading ramp angle
93—loading ramp
94—All Terrain Vehicle (ATV)
95—riding lawn mower
96—cargo
97—motorcycle
98—loading dock

DETAILED DESCRIPTION OF SELECTED EMBODIMENTS

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, in selected embodiments, a cargo area 15 or bed 15 of a vehicle such as a pickup truck may include a tailgate 10, two bed sides 17 or side walls 17, two tailgate supports 20 (e.g., cables 20, linkages 20, etc.), and a bed floor 16. A tailgate 10 may be pivotable about a tailgate pivot 11 and have a pivot edge 12 and a leading or top edge 13. The tailgate 10 may be supported or suspended in the open position by the tailgate supports 20. One end of each tailgate support 20 may be attached to a stud 24 located on the side walls 17 or bed sides 17 of the cargo area 15. The other end of each tailgate support 20 may be connected to a tailgate side 14. The tailgate 10 may be pivotable about a tailgate pivot 11 between a generally vertical closed position and an open position.

Referring to FIGS. 2 through 7, in selected embodiments, a tailgate support 20 may include hardware that is identical or nearly identical to that found on existing, common, or conventional tailgate systems. For example, a first end 21 of a tailgate support 20 may be sized and shaped to engage and retain a stud 24 extending from the side wall 17 of a vehicle. A second end 22 of a tailgate support 20 may be attached the tailgate side 14 by a fastener 29 (e.g., bolt 29). In selected embodiments, a second end 22 may include an aperture for receiving the fastener 29 therethrough.

A vehicle in accordance with the present invention may include one or more adjustors 30. An adjustor 30 may form an interface between a tailgate support 20 and a vehicle. As such, an adjustor 30 may be viewed as part of a tailgate support 20, as part of the vehicle (e.g., tailgate 10, side wall 17, etc.), or as an independent component separable from both the tailgate support 20 and the vehicle. One or more adjustors 30 (e.g., one or perhaps two for each tailgate support 20) in accordance with the present invention may be installed on a vehicle in an initial manufacturing process or in an aftermarket installation or modification.

In selected embodiments, an adjustor 30 may include a traveler 40 and a base 41. A traveler 40 may be configured to move between various positions or locations on or with respect to a base 41. A base 41 may, in turn, be formed in, mounted on, or fixed with respect to a portion of the vehicle. For example, as in the illustrated embodiment, a base 41 may be formed in, mounted on, or otherwise fixed with respect to the tailgate 10. A first end 21 of a tailgate support 20 may engage the side wall 17 of the vehicle, while a second end 22 of the tailgate support 20 engages the traveler 40. Accordingly, by manipulating the position of the traveler 40 with respect to the base 41, the location of suspension for the tailgate 10 may be adjusted.

Alternatively, a base 41 may be formed in, mounted on, or fixed with respect to the side wall 17 of a vehicle. In such embodiments, a first end 21 of a tailgate support 20 may be connected to the traveler 40, while a second end 22 of the tailgate support 20 engages the tailgate 10. In still other embodiments, adjustors 30 may be positioned at each end of a tailgate support 20 (i.e., one adjustor 30 on the side wall 17 and another on the tailgate 10). In such embodiments, a first end 21 of a tailgate support 20 may be connected to the traveler 40 of one adjustor 30, while a second end 22 of the tailgate support 20 engages the traveler 40 of the other adjustor 30.

In all such embodiments, by manipulating the position of the traveler 40 or travelers 40 with respect to the respective base 41 or bases 41, the location of suspension for the tailgate 10 may be adjusted. This may be done by freeing the traveler 40 with respect to the base 41, moving the traveler 40 with respect to the base 41 from a first location to a second location, and then fixing the traveler 40 with respect to the base 41 (e.g., to preclude substantially all relative motion therebetween).

Changes in the location of suspension of a tailgate 10 may be reflected in the angle 35 from vertical to the tailgate 10. Actuating or manipulating an adjustor 30 may adjust the angle 35 of a tailgate 10 between various distinct values. One such value 36 may correspond to a tailgate 10 supported or suspended in a conventional open position, which is about ninety degrees of rotation from the closed position. Another such value 37 may correspond to a tailgate 10 supported or suspended with its leading or top edge 13 lower than it is in the convention open position. Yet another such value 38 may correspond to a tailgate 10 supported or suspended with its leading or top edge 13 higher than it is in the convention open position.

An adjustor 30 in accordance with the present invention may be configured with a guard to protect the adjustor 30 from the weather and from damage that may be caused by inadvertent impact. This guard may reduce or eliminate any adverse effects from weather or use on the adjustor 30.

Referring to FIGS. 8 through 13, in selected embodiments, a tailgate support 20 may include a length of cable 23. Additionally, a first end 21 of a tailgate support 20 in accordance with the present invention may include an aperture 25 sized and shaped to engage and retain a stud 24 extending from the side wall 17 of a vehicle. At the other end 22, a tailgate support 20 may have an aperture 27 formed therein for receiving a fastener 29 therethrough. The fastener 29 may then connect the second end 22 of the tailgate support 20 to the adjustor 30 (e.g., traveler 40). The adjustor 30 may be located on the tailgate side 14 or elsewhere, as noted above.

In certain embodiments, a base 41 may be formed as a rail 41 or track 41. In such embodiments, a traveler 40 may be configured to slide along or within the rail 41 or track 41. In selected embodiments, an adjustor 30 may include a lock 45. A lock 45 in accordance with the present invention may have any configuration suitable for selectively fixing a traveler 40 with respect to a base 41.

A lock 45 may selectively fix a traveler 40 with respect to a base 41 at multiple locations. In certain embodiments, a traveler 40 may include an array of apertures 31a, 31b, 31c, a base 41 may include a locking aperture 26, and a lock 45 may comprise a locking pin 46. When an aperture 31b of the traveler 40 is aligned with the locking aperture 26 of a base 41, the apertures 31b, 26 may collectively form a composite aperture. The locking pin 46 may be inserted within this composite aperture and effectively lock or fix the traveler 40 with respect to the base 41.

Removal of the locking pin 46 may permit a traveler 40 to again slide (e.g., translate, exclusively translate, etc.) along or within a base 41. Accordingly, a user may slide a traveler 40 along or within a base 41, aligning another aperture 31a, 31c of the traveler 40 with a the locking aperture 26 in the base 41. Once this alignment is achieved, the locking pin 46 may be inserted within the new composite aperture, thereby securing the traveler 40 in a new location or position with respect to the base 41.

Each aperture 31a, 31b, 31c of a traveler 40 may correspond to a different opening angle 35 and, therefore, a different suspended position of a tailgate 10. In selected embodiments, an intermediate aperture 31b may correspond to a tailgate 10 supported or suspended in a conventional open position, which is about ninety degrees of rotation from the closed position. Apertures 31c on one side of that intermediate aperture 31b may correspond to a tailgate 10 supported or suspended with its leading or top edge 13 lower than it is in the convention open position. Apertures 31a on the other side of that intermediate aperture 31b may correspond to a tailgate 10 supported or suspended with its leading or top edge 13 higher than it is in the convention open position. The number of apertures 31 on each side of an intermediate aperture 31b need not be balanced. For example, in selected embodiments, a traveler 40 may have only two apertures 31 as shown in FIG. 7 and, therefore, support a tailgate 10 in the convention open position and only one other open position (e.g., an open position lower than the conventional open position).

In selected embodiments, a traveler 40 may include an aperture 34 (e.g., threaded aperture 34) to receive the fastener 29 securing an end 22 of a tailgate support 20 thereto. In certain embodiments, a traveler 40 may also include a rotation stop 33. The rotation stop 33 of a traveler 40 may act in cooperation with one or more rotation stops 28 of a tailgate support 20 to ensure that the tailgate support 20 flexes or bends in the proper direction as the tailgate 10 moves toward closure.

In certain embodiments, a traveler 40 may include a mount 32 or attachment stud 32. A biasing member 50 (e.g., coil spring 50) may attach at one end to the mount 32. The other end of the biasing member 50 may attach to a mount 52 or attachment stud 52 located on the inside of the tailgate 10. In certain embodiments, a base 41 may include a slot 43. The mount 32 or attachment stud 32 extending from a traveler 40 may extend through, and be free to slide within, the slot 43 throughout the range of motion of the traveler 40. The biasing member 50 may bias the traveler 40 toward one end (e.g., the open end) of a base 41.

In such embodiments, when the lock 45 is disengaged and the tailgate 10 pivots toward the closed position, the biasing member 50 may move the traveler 40 toward one end of the base 41. Conversely, when the lock 45 is disengaged and the tailgate 10 is pivoted away from the closed position, the biasing member 50 may permit a traveler 40 to move toward a stop 42 formed in the base 41, thereby storing energy within the biasing member 50.

A stop 42 formed as part of a base 41 may prevent a traveler 40 from inadvertently sliding off or out of a base 41. In selected embodiments, the other end of a base 41 (i.e., the end opposite a stop 42) may be open to facilitate installation of the traveler 40. In such embodiments, the length of the slot 43 may define a portion (e.g., one end) of the range of motion of a traveler 40 along or within a base 41.

In certain embodiments, a lock 45 may include a locking pin 46, a pin boss 47, a solenoid 48, and a solenoid frame 49. A pin boss 47 may be mounted on the inside of the tailgate 10 opposite a base 41 to provide reinforcement and help guide a locking pin 46 into and out of engagement. In selected embodiments, a solenoid 48 may be spring biased towards the engaged position and may retract the locking pin 46 when activated. The solenoid 48 may be secured in place by a solenoid frame 49.

Any suitable actuation devices may be used to selectively fix and free a traveler 40 with respect to a base 41. While the embodiments described hereinabove have focused on electrical actuation devices (i.e., solenoids 48), other technologies may be used in place of electrical actuation devices. For example, in selected embodiments, mechanical linkages may be incorporated into systems in accordance with the present invention.

The components of an adjustor 30 in accordance with the present invention may be formed of any suitable material or combination of materials. Suitable materials may be selected based on cost, formability, strength, durability, corrosion resistance, and the like. In selected embodiments, the components of an adjustor 30 may be formed of metal, metal alloys, or combinations thereof.

Referring to FIG. 14, a system in accordance with the present invention may include an actuator 44 for disengaging (e.g., simultaneously disengaging) the locks 45 of the various adjustors 30 located on a vehicle. For example, in selected embodiments, a system may include an actuator 44 mounted on a tailgate 10 adjacent a tailgate release handle 39. The actuator 44 may be an electric button 44 connected to the various solenoids 48 of the various adjustors 30. Depression of the actuator 44 may activate the solenoids 48, causing them to withdraw the locking pins 46 from corresponding apertures 31 and, thereby, freeing the corresponding travelers 40.

To adjust the position in which a tailgate 10 is supported or suspended, a user may first disengage the various locks 45 (e.g., depress an actuator 44 to withdraw the locking pins 46) to free the corresponding travelers 40. The user may then pivot the tailgate 10 up or down slightly and release the actuator 44. This pivoting may ensure that the apertures 31 of the travelers 40 have moved out of alignment with the locking pins 46. The release of the actuator 44 may free the corresponding locking pins 46 to act as biased. The user may then continue to pivot the tailgate 10 until different locking apertures 31 of the various travelers 40 align with the locking apertures 26 of the corresponding bases 41 to form new composite apertures. Once new composite apertures are formed, the various locks 45 may automatically insert the corresponding locking pins 46 into the new composite apertures, thereby fixing the travelers 40 in their new locations.

Referring to FIGS. 15 through 17, in certain alternative embodiments, an adjustor 30 may include a traveler 40 comprising a pin 55 and a base 41 comprising an array of apertures 56 or sockets 56 shaped to receive the pin 55 therewithin. In such embodiments, a traveler 40 may include a rotation stop 33 secured to the pin 55 by a retaining ring 51. The rotation stop 33 may have a first extension configured to engage one or more rotation stops 28 of a tailgate support 20 and a second extension configured to engage (e.g., be received within) an aperture 53 formed in the base 41. This second extension may prevent a rotation stop 33 from rotating with respect to a base 41 about the pin 55. In selected embodiments, each socket 56a, 56b of a base 41 may have a corresponding aperture 53a, 53b such that the rotation stop 33 of a traveler 40 may be secured regardless of the socket 56 into which the pin 55 is inserted.

Each socket 56a, 56b, 56c of a traveler 40 may correspond to a different opening angle 35 and, therefore, a different suspended position of a tailgate 10. In selected embodiments, an intermediate socket 56b may correspond to a tailgate 10 supported or suspended in a conventional open position, which is about ninety degrees of rotation from the closed position. Sockets 56c on one side of that intermediate socket 56b may correspond to a tailgate 10 supported or suspended with its leading or top edge 13 lower than it is in the convention open position. Sockets 56a on the other side of that intermediate socket 56b may correspond to a tailgate 10 supported or suspended with its leading or top edge 13 higher than it is in the convention open position. The number of sockets 56 on each side of an intermediate socket 56b need not be balanced.

In such embodiments, a lock 45 may comprise a detent mechanism 54 and a detent release button 57. For example, when the pin 55 of a traveler 40 is inserted within the socket 56 of a base 41, a detent mechanism 54 on the pin 55 may engage a groove 58 formed within the socket 56. To move the traveler 40 with respect to the base 41, a user may depress the detent release button 57 to disengage the lock 45, withdraw the pin 55 from the socket 56, move the pin 55 to a new socket 56, and then insert the pin 55 into the new socket 56 until the detent mechanism 54 engages the groove 58 in the new socket 56. Accordingly, a detent release button 57 may be considered an actuator 44 in accordance with the present invention.

Referring to FIGS. 18 through 20, in certain alternative embodiments, a tailgate support 20 may extend to connect the traveler 40 of one adjustor 30a to the traveler 40 of another adjustor 30b. For example, one adjustor 30b may be configured as described with respect to FIGS. 15 through 17. The other adjustor 30a may comprise one or more bases 41a, 41b formed in, mounted on, or fixed with respect to the side wall 17 of a vehicle. Such embodiments may increase the number and range of tailgate positions. For example, another adjustor 30a may enable a tailgate support 20 to support or suspend a tailgate 10 in higher positions than those provided by the primary adjustor 30b acting alone.

Referring to FIGS. 21 through 28, in certain alternative embodiments, an adjustor 30 may comprise a traveler 40 configured to rotate with respect to a corresponding base 41. In such embodiments, a fastener 29 may pivotably connect a traveler 40 to a receiver 65 (e.g., threaded boss 65) formed as part of a base 41. The fastener 29 may pass through a bushing 61, enabling the traveler 40 to rotate thereabout. The traveler 40 may include an aperture 64 for pivotable receiving a post 60 extending from an end 22 of a tailgate support 20. A retaining ring 67 may secure the post 60 within the aperture 64.

In selected embodiments, a biasing member 50 may extend between a traveler 40 and the base 41 (or tailgate 14 or side wall 17 of the vehicle). The ends of the biasing member 50 may be formed as tabs 63 or extensions 63. Corresponding apertures 62 in the base 41 (or tailgate 14 or side wall 17 of the vehicle) may receive the tabs 63 or extensions 63 therewithin. Accordingly, the biasing member 50 may bias the traveler 40 such that when the lock 45 is disengaged and the tailgate 10 is pivoted toward the closed position, the traveler 40 may rotate, maintaining tension in the tailgate support 20 until the next aperture 31 is aligned with the locking pin 46. When the lock 45 is disengaged and the tailgate 10 is pivoted away from the closed position, the traveler 40 may rotate, loading the biasing member 50 with energy until the next aperture 31 is aligned with the locking pin 46.

Figure 28:
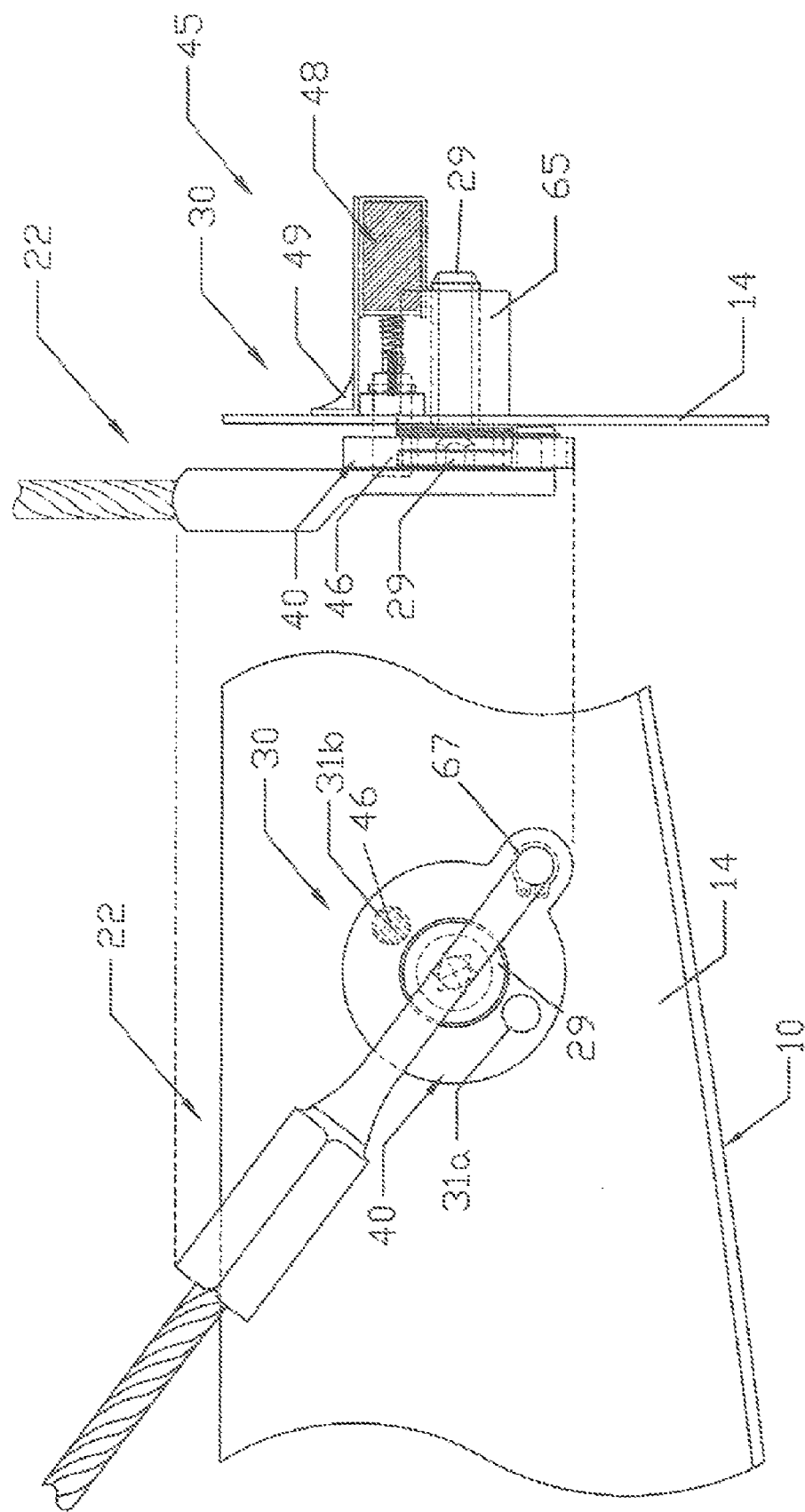
FIG. 28 provides partial, rear and side elevation views of the tailgate support and adjustor system of FIG. 26.

Each aperture 31 of a traveler 40 configured to rotate with respect to a corresponding base 41 may support or produce a different angle 35 of a tailgate 10. In selected embodiments, an intermediate aperture 31b may correspond to a tailgate 10 supported or suspended in a conventional open position, which is about ninety degrees of rotation from the closed position. Apertures 31c on one side of that intermediate aperture 31b may correspond to a tailgate 10 supported or suspended with its leading or top edge 13 lower than it is in the convention open position. Apertures 31a on the other side of that intermediate aperture 31b may correspond to a tailgate 10 supported or suspended with its leading or top edge 13 higher than it is in the convention open position. The number of apertures 31 on each side of an intermediate aperture 31b need not be balanced. For example, in selected embodiments, a traveler 40 may have only two apertures 31 as shown in FIGS. 26 through 28 and, therefore, support a tailgate 10 in the convention open position and only one other open position (e.g., an open position lower than the conventional open position).

Referring to FIG. 29, while the embodiments described hereinabove include tailgate supports 20 comprising apertures 25, other attachment mechanisms may be used or substituted in the embodiments described. Accordingly, the first end 21 of a tailgate support 20 may be configured to fit existing, common, or conventional tailgate systems. For example, in the illustrated embodiment, the first end 21 of a tailgate support 20 has been configured to fit an alternative embodiment of a stud 24 extending from the vehicle (e.g., from the side wall 17 of a truck bed).

Referring to FIGS. 30 and 31, by allowing a tailgate 10 to open more than ninety degrees, embodiments in accordance with the present invention lower the leading or top edge 13 of the tailgate 10. This may result in a reduction in the incline of loading ramps 93 used when loading items such as motorcycles, ATV's 94, small tractors, or the like into the bed of a vehicle. By reducing the loading ramp angle 92 of the loading ramps 93, it may be easier and safer to load and unload such items.

Referring to FIGS. 32 through 35, a tailgate 10 with a lower leading edge 13 may facilitate loading of items with low ground clearance (e.g., riding lawn mowers 95). Such items would normally hang on the leading edge 13 of a conventional tailgate 10 at the location where the loading ramps 93 rest. However, in embodiments in accordance with the present invention, when the leading edge 13 of the tailgate 10 is lowered below the plane of the bed floor 16, both the incline of the loading ramps 93 and the break-over angle 91 are reduced.

The break-over angle 91 may be defined as the angle between the plane of the tailgate 10 extended rearward and the angle of the loading ramp(s) 93. The angle that a tailgate 10 rotates down from the conventional open position to a fully open position in accordance with the present invention may be referred to as the tailgate decline angle 90. Accordingly, between the tailgate decline angle 90 and the reduced break-over angle 91, embodiments in accordance with the present invention may provide a more gradual transition from ground to bed floor 16.

Figure 36:
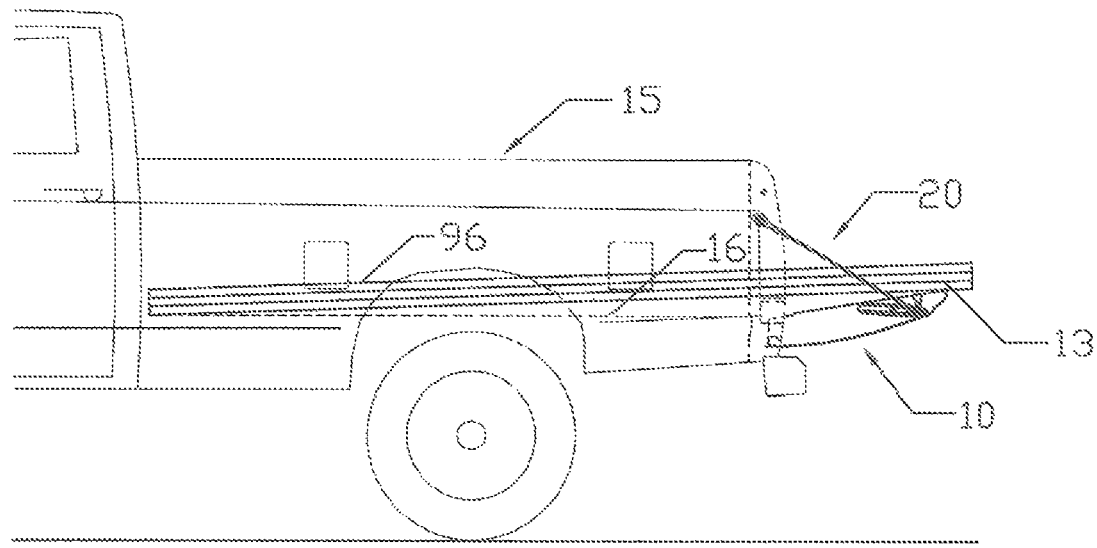
FIG. 36 is a schematic diagram illustrating a tailgate suspended, by a tailgate support and adjustor system in accordance with the present invention, above a conventional open position to better retain cargo extending longer than the bed of the pickup truck.
Figure 37:
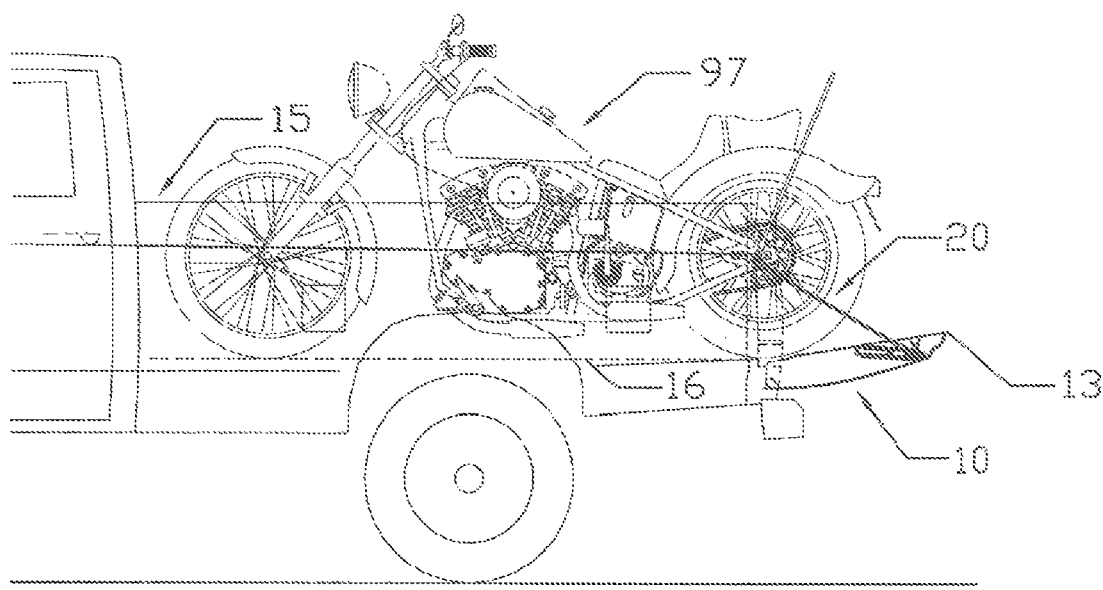
FIG. 37 is a schematic diagram illustrating a tailgate suspended, by a tailgate support and adjustor system in accordance with the present invention, above a conventional open position to better retain cargo extending longer than the bed of the pickup truck.
Figure 38:
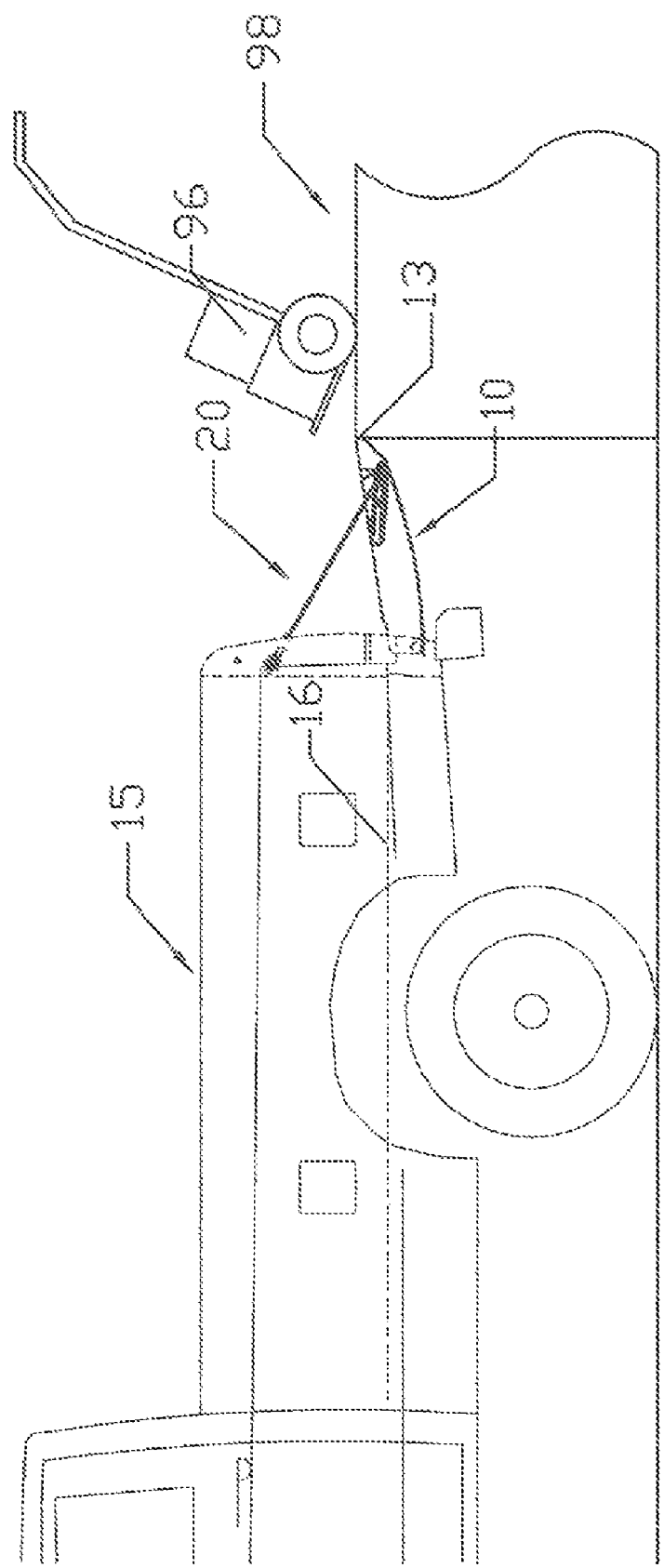
FIG. 38 is a schematic diagram illustrating a tailgate suspended, by a tailgate support and adjustor system in accordance with the present invention, above a conventional open position to facilitate loading the bed of a pickup truck from surfaces higher than the bed.

Referring to FIGS. 36 through 38, additionally, embodiments in accordance with the present invention allow the height of the leading edge 13 of the tailgate 10 to be easily adjusted to facilitate moving cargo between the pickup bed floor 16 and loading docks 98 of various heights. They may also facilitate securement of cargo 96 (e.g., motorcycles 97 or lumber) that is longer than the vehicle bed 15.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for positioning a tailgate of a vehicle, the method comprising:
   selecting a vehicle comprising
       a first side, second side, tailgate, tailgate support, and adjustor,
       the tailgate connected to pivot with respect to the first and second sides through a range of motion,
       the adjustor comprising a base fixed with respect to the tailgate and a traveler selectively movable with respect to the base, and
       the tailgate support comprising a first end connected to the first side, a second end connected to the traveler, and a flexible intermediate portion extending to connect the first end to the second end;
   unlocking the traveler with respect to the base;
   moving, after the unlocking, the traveler with respect to the base from a first location to a second location; and
   locking, after the moving, the traveler with respect to the base to preclude substantially all relative motion therebetween.

2. The method of claim 1, wherein the selecting comprises selecting the vehicle having at least one of the base and the traveler comprising a plurality of apertures.

3. The method of claim 2, wherein the freeing comprises removing a pin from a first aperture of the plurality of apertures.

4. The method of claim 3, wherein the moving comprises aligning a second aperture of the plurality of apertures with the pin.

5. The method of claim 4, wherein the fixing comprises inserting the pin within the second aperture.

6. The method of claim 1, wherein the moving comprises translating the traveler with respect to the base.

7. The method of claim 6, wherein the moving comprises substantially exclusively translating the traveler with respect to the base.

8. The method of claim 1, wherein the moving comprises rotating the traveler with respect to the base.

9. The method of claim 8, wherein the moving comprises substantially exclusively rotating the traveler with respect to the base.

10. A method for positioning a tailgate of a vehicle, the method comprising:
    selecting a vehicle comprising
        a first side, second side, tailgate, tailgate support, and adjustor,
        the tailgate connected to pivot with respect to the first and second sides through a range of motion,
        the adjustor comprising a base fixed with respect to the first side and a traveler selectively movable with respect to the base, and
        the tailgate support comprising a first end connected to the traveler, a second end connected to the tailgate, and a flexible
    intermediate portion extending to connect the first end to the second end;
    unlocking the traveler with respect to the base;
    moving, after the unlocking, the traveler with respect to the base from a first location to a second location; and
    locking, after the moving, the traveler with respect to the base to preclude substantially all relative motion therebetween.

11. The method of claim 10, wherein the selecting comprises selecting the vehicle having at least one of the base and the traveler comprising a plurality of apertures.

12. The method of claim 11, wherein the freeing comprises removing a pin from a first aperture of the plurality of apertures.

13. The method of claim 12, wherein the moving comprises aligning a second aperture of the plurality of apertures with the pin.

14. The method of claim 13, wherein the fixing comprises inserting the pin within the second aperture.

15. The method of claim 10, wherein the moving comprises translating the traveler with respect to the base.

16. The method of claim 15, wherein the moving comprises substantially exclusively translating the traveler with respect to the base.

17. The method of claim 10, wherein the moving comprises rotating the traveler with respect to the base.

18. The method of claim 17, wherein the moving comprises substantially exclusively rotating the traveler with respect to the base.

19. A vehicle comprising:
a first side;
a second side;
a tailgate connected to pivot with respect to the first and second sides through a range of motion; and
a tailgate support system comprising
a first end, a second end, a flexible intermediate portion extending to connect the first end to the second end, and an adjustor forming one of the first and second ends,
the adjustor having a pin, a base fixed with respect to one of the first side and the tailgate, and a traveler selectively movable with respect to the base between a first location and a second location,
the first end connected to the first side and the second end connected to the tailgate,
at least one of the base and the traveler comprising a plurality of apertures,
the pin, inserted with a first aperture of the plurality apertures, locking the traveler in the first location, and
the pin, inserted with a second aperture of the plurality apertures, locking the traveler in the second location.

20. The vehicle of claim 19, wherein:
the range of motion comprises a first, closed position, a second, open position, and a third, open position, the second position being located about ninety degrees of rotation from the first position;
the tailgate support system, with the traveler locked in the first location, suspending the tailgate in the second position; and
the tailgate support system, with the traveler locked in the second location, suspending the tailgate in the third position.

* * * * *